United States Patent
Matsubara

[11] 4,113,356
[45] Sep. 12, 1978

[54] ZOOM LENS SYSTEM WITH HIGH ZOOMING RATIO

[75] Inventor: Masaki Matsubara, Hachiouji, Japan

[73] Assignee: Olympus Optical Co., Ltd., Japan

[21] Appl. No.: 788,961

[22] Filed: Apr. 19, 1977

[30] Foreign Application Priority Data

Apr. 20, 1976 [JP] Japan .................................. 51-45212
Apr. 20, 1976 [JP] Japan .................................. 51-45213

[51] Int. Cl.² ............................................. G02B 15/18
[52] U.S. Cl. .................................................. 350/186
[58] Field of Search ............................... 350/184, 186

[56] References Cited

U.S. PATENT DOCUMENTS 3,393,958  7/1968  Takano .................................. 350/184
3,549,235  12/1970 Macher .................................. 350/184
3,891,304  6/1975  Muszumanski ...................... 350/184

Primary Examiner—Conrad J. Clark
Attorney, Agent, or Firm—Cushman, Darby & Cushman

[57] ABSTRACT

A compact zoom lens system with high zooming ratio for which the range of focal length is 16 to 192, i.e., the zooming ratio is 1:12, and aperture ratio is large and which comprises a focusing lens group having positive power, a variator lens group having negative power, a compensator lens group having negative power, an erector lens group having positive power and a master lens group.

22 Claims, 41 Drawing Figures

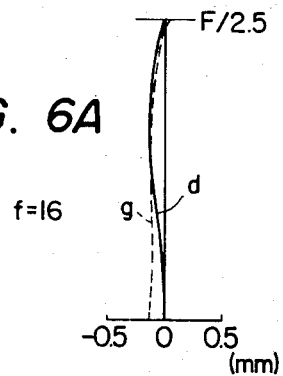
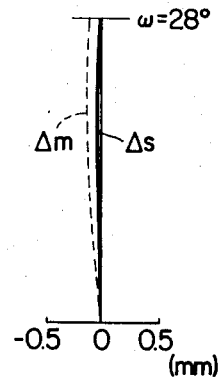
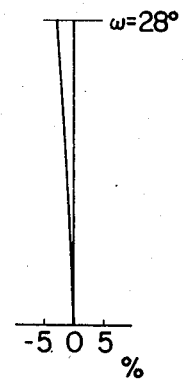
FIG. 6A  f=16
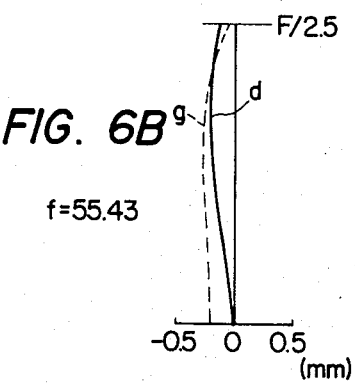
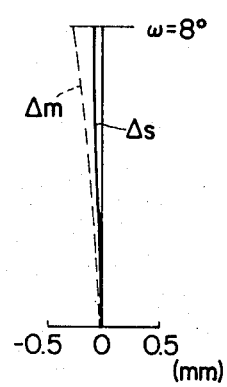
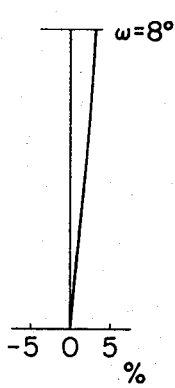
FIG. 6B  f=55.43
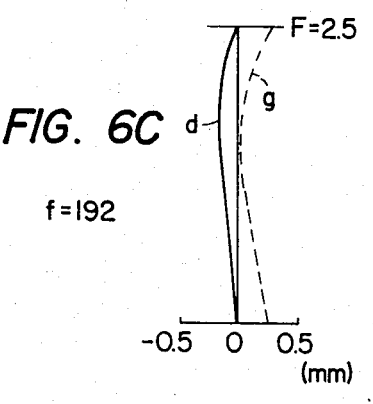
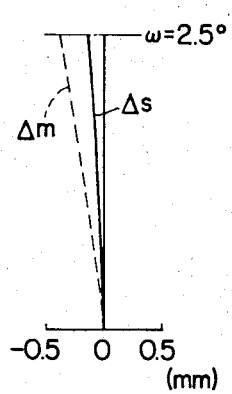
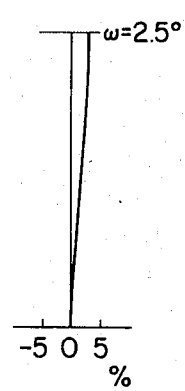
FIG. 6C  f=192

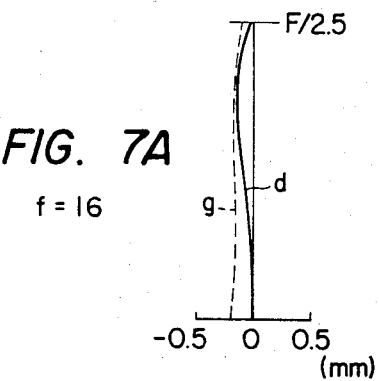
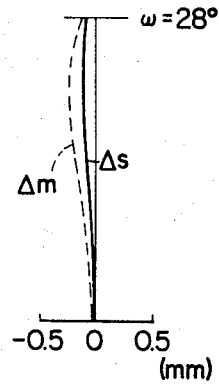
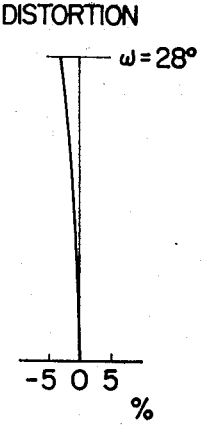
FIG. 7A
f = 16
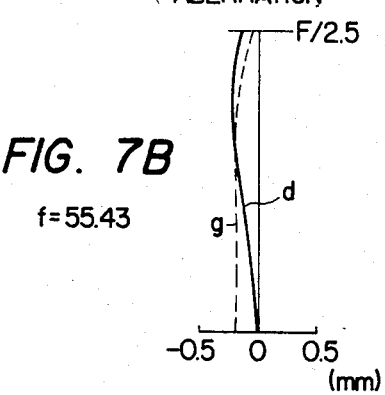
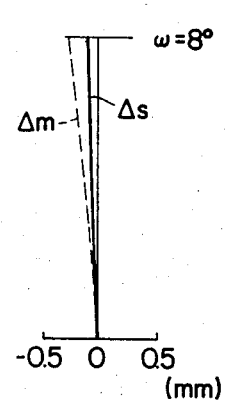
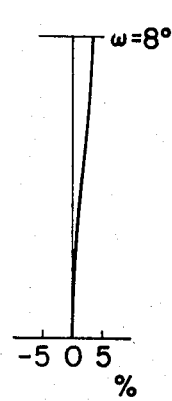
FIG. 7B
f = 55.43
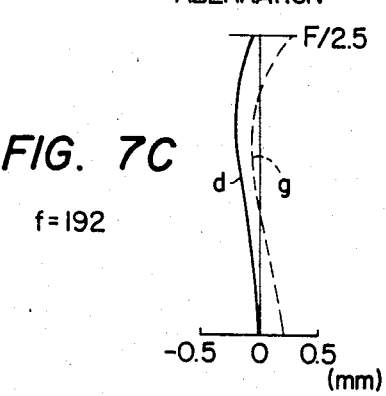
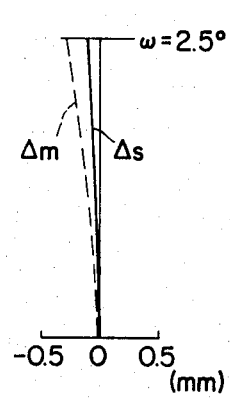
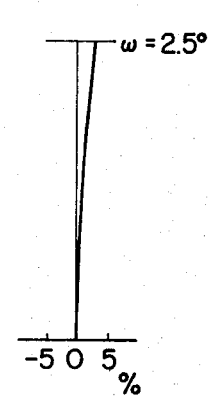
FIG. 7C
f = 192

FIG. 8A
f = 16
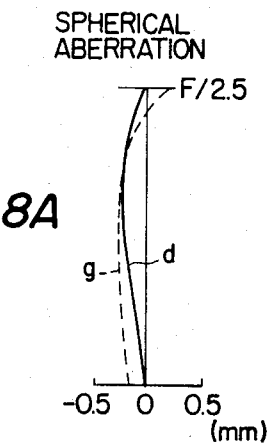
SPHERICAL ABERRATION
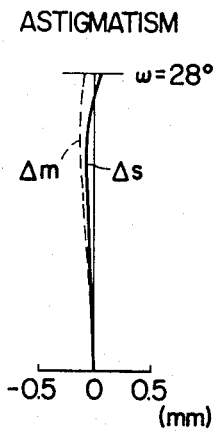
ASTIGMATISM
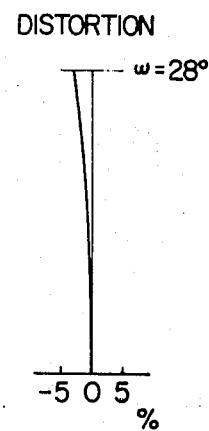
DISTORTION
FIG. 8B
f = 55.43
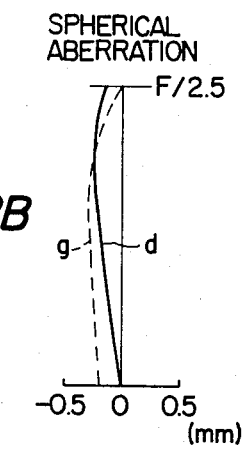
SPHERICAL ABERRATION
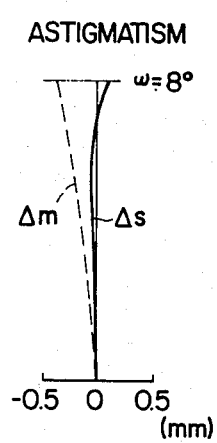
ASTIGMATISM
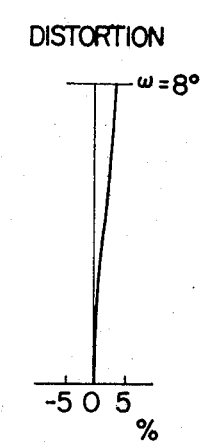
DISTORTION
FIG. 8C
f = 192
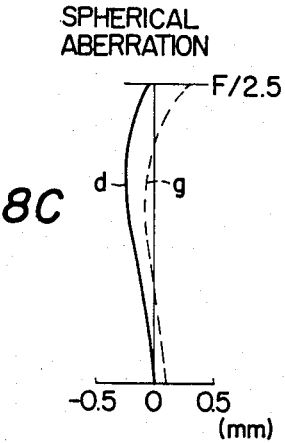
SPHERICAL ABERRATION
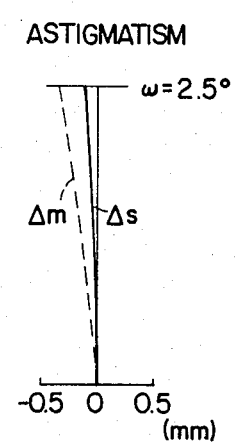
ASTIGMATISM
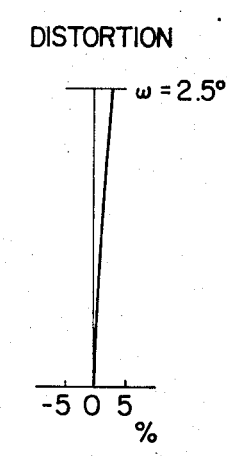
DISTORTION

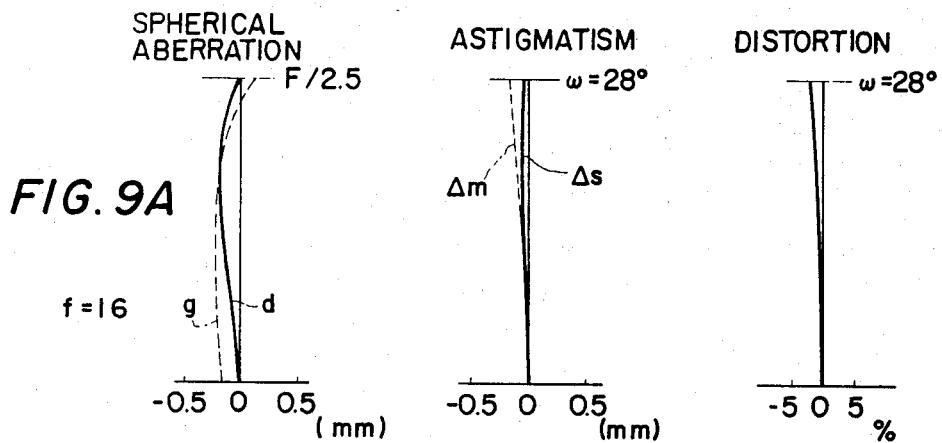
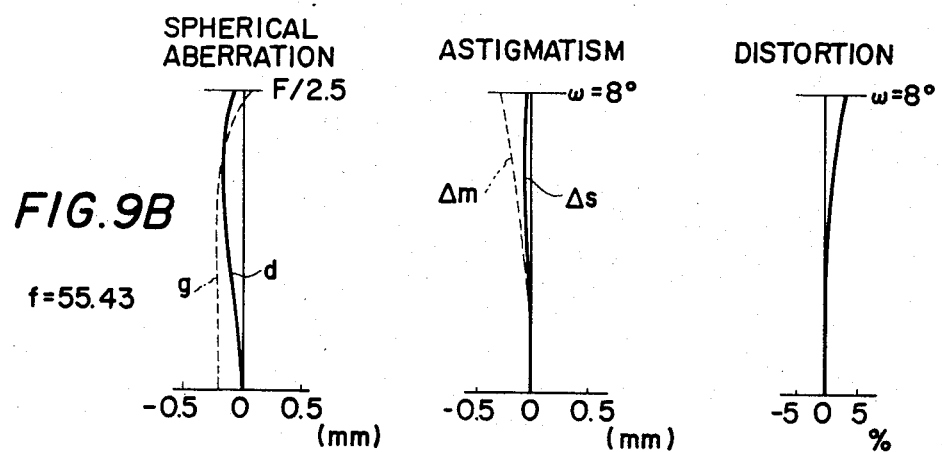
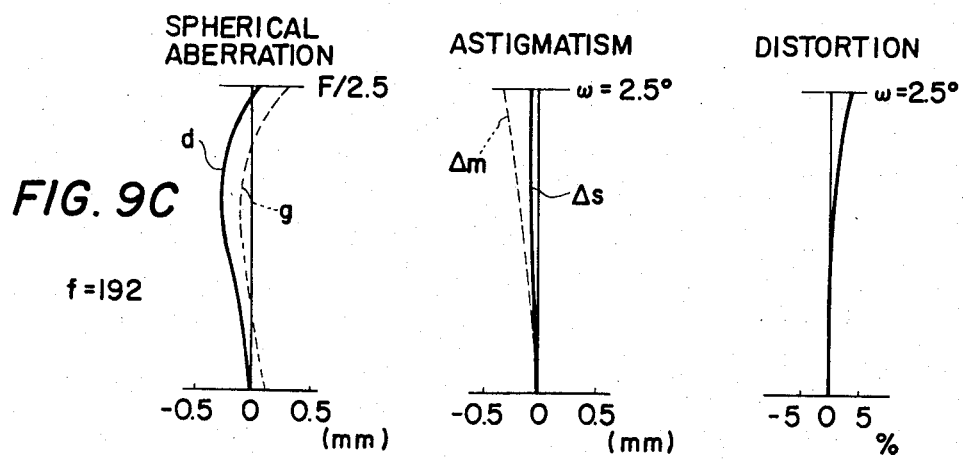

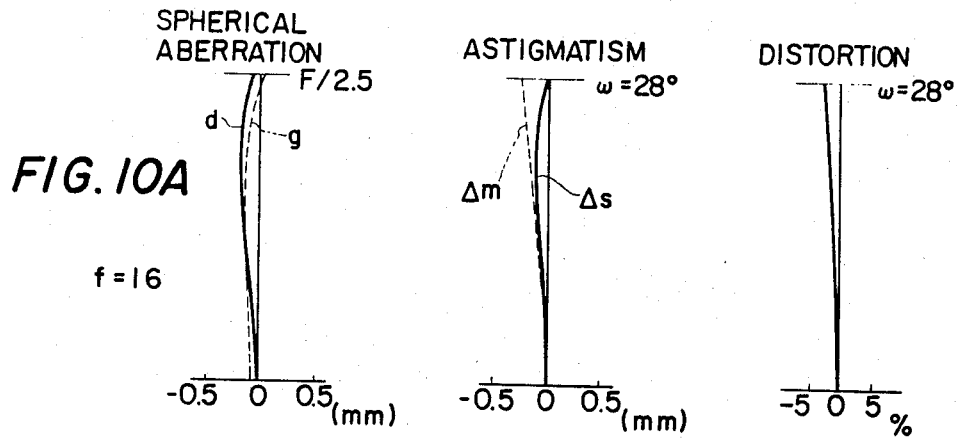
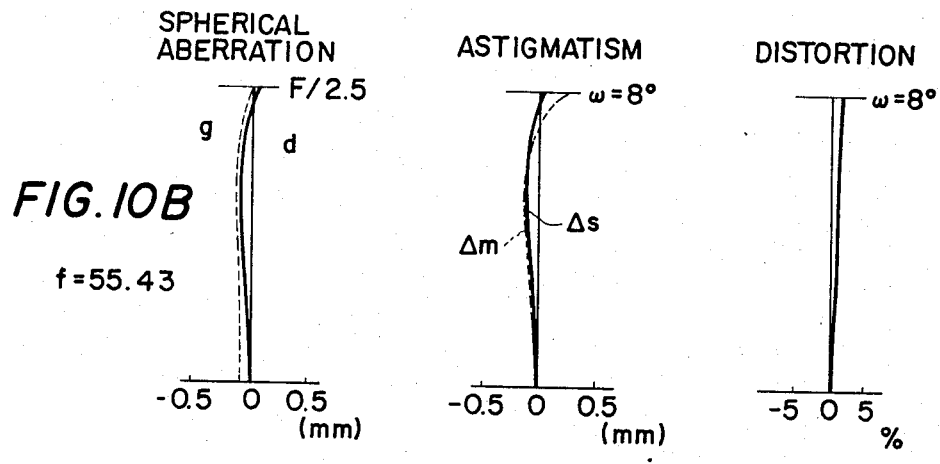
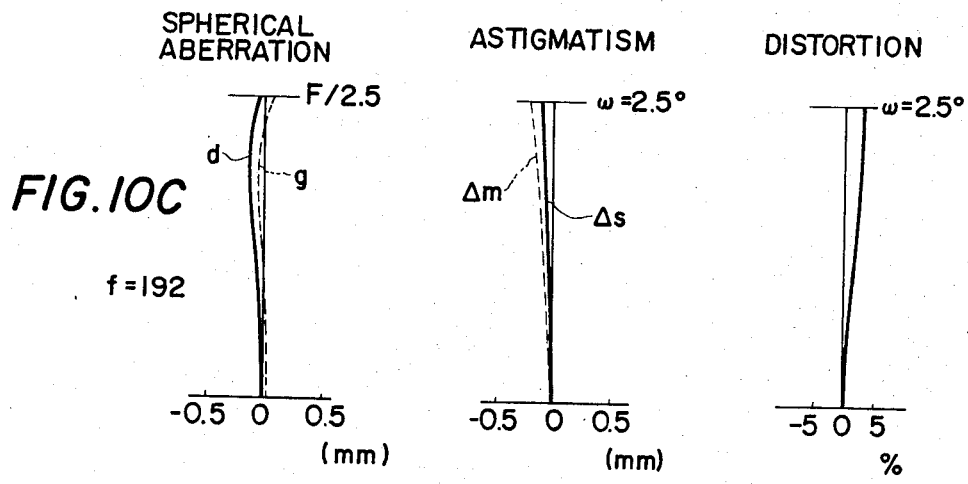

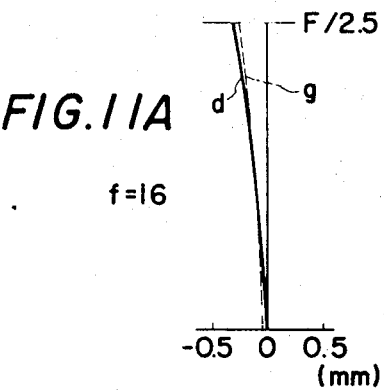
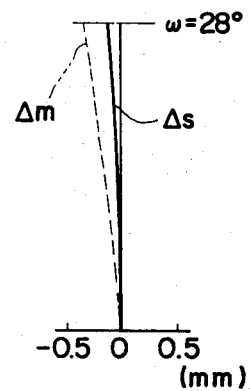
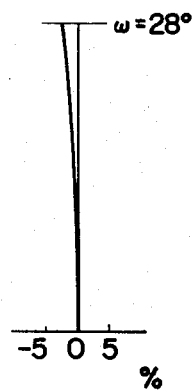
FIG.11A  f=16
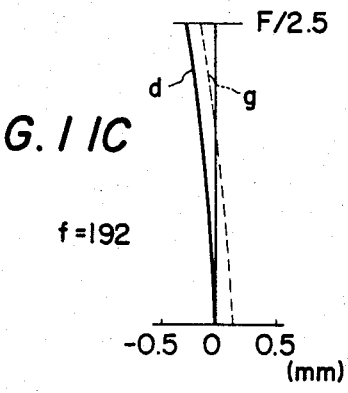
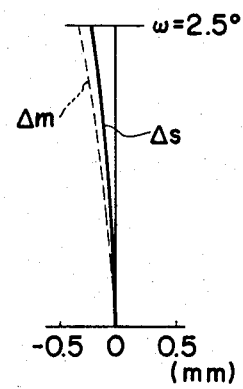
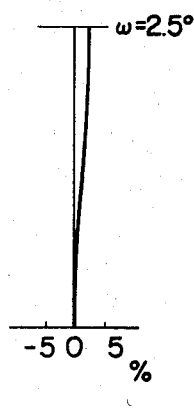
FIG.11B  f=55.43
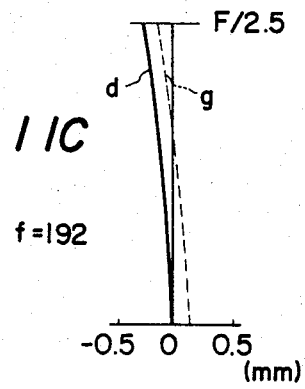
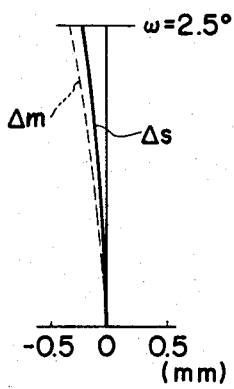
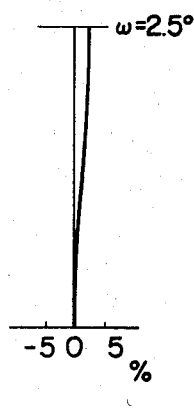
FIG.11C  f=192

FIG. 12A
f=16
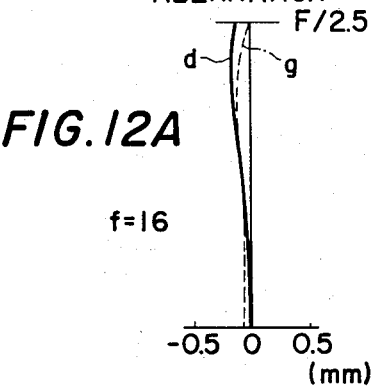
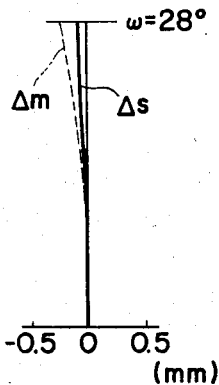
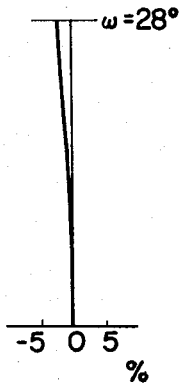
FIG. 12B
f=55.43
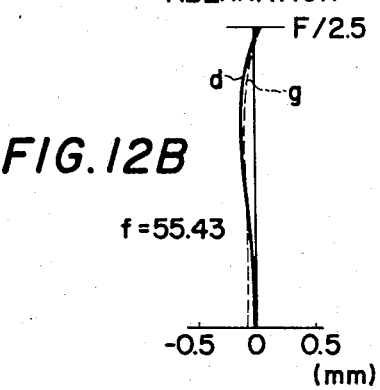
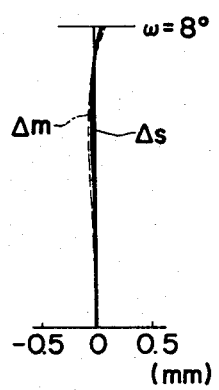
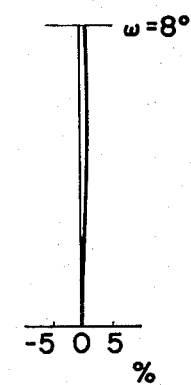
FIG. 12C
f=192
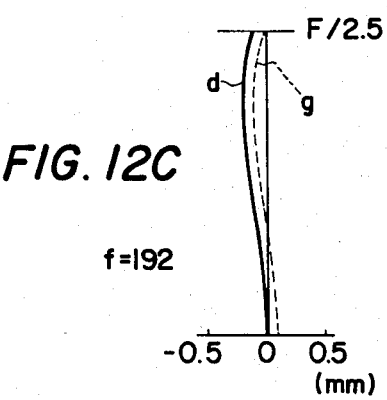
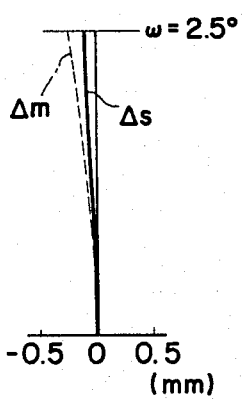
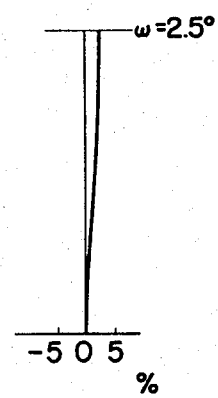

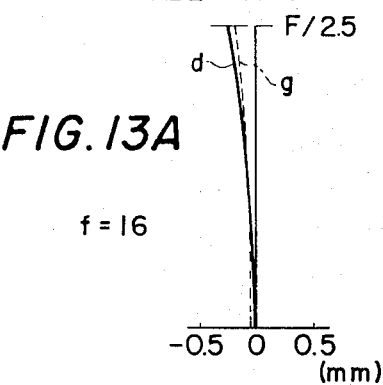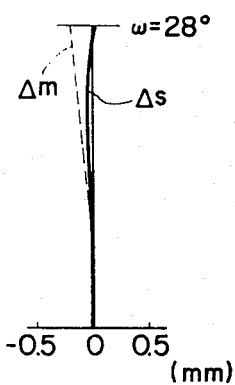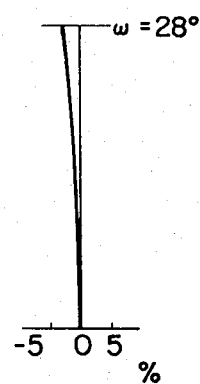
FIG.13A  f = 16
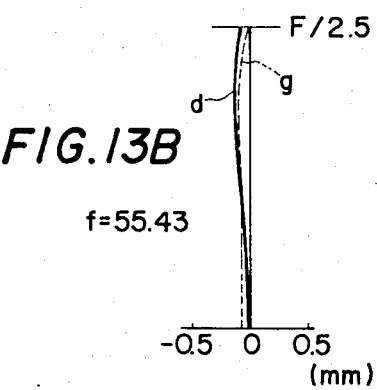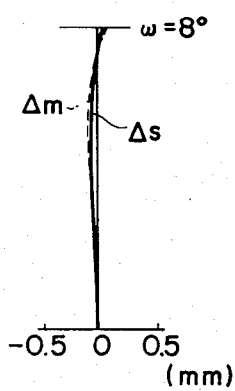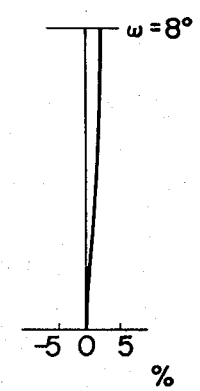
FIG.13B  f = 55.43
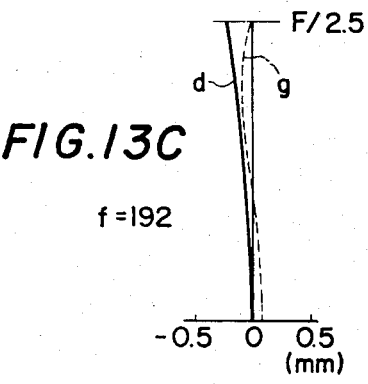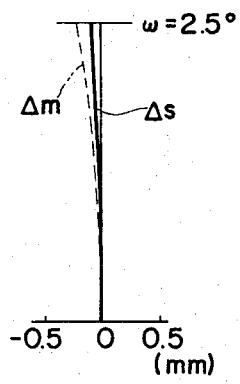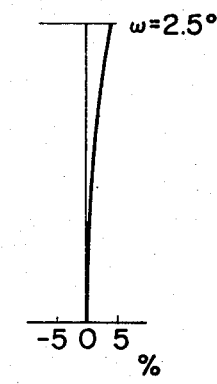
FIG.13C  f = 192

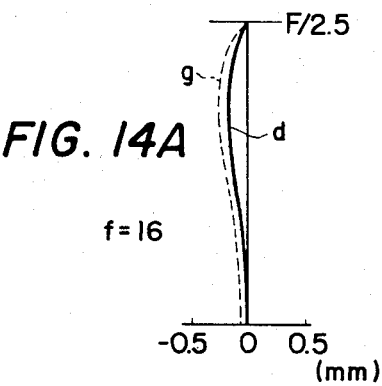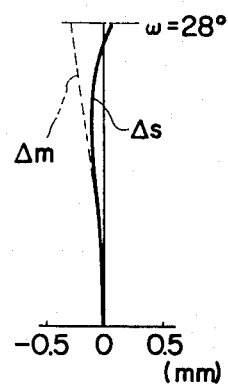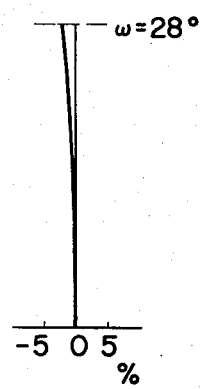
FIG. 14A  f=16
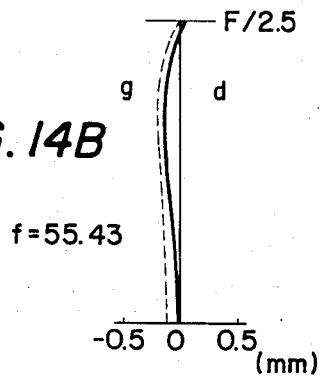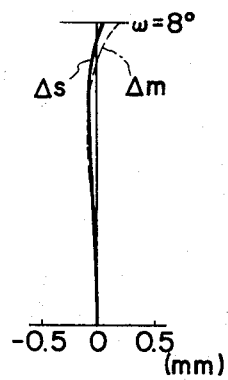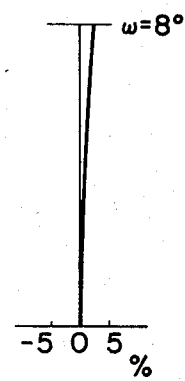
FIG. 14B  f=55.43
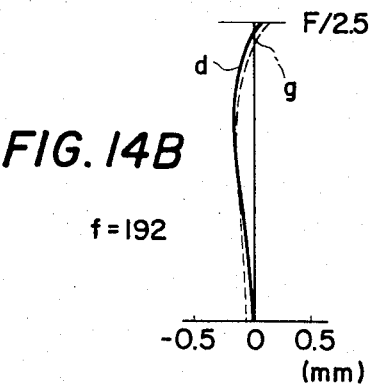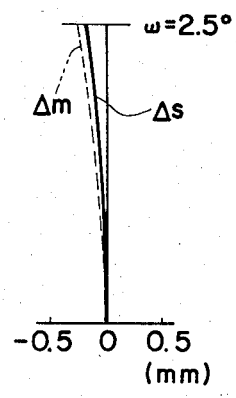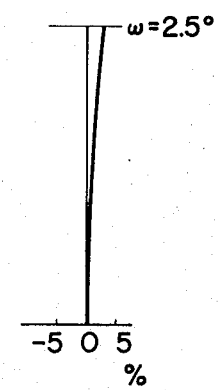
FIG. 14B  f=192

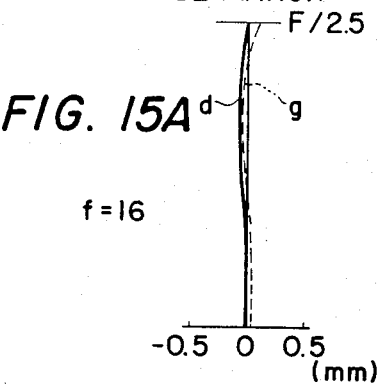
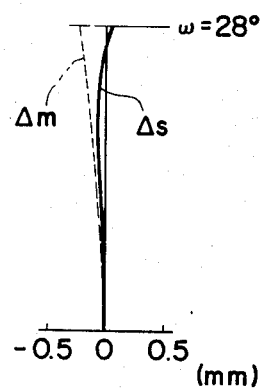
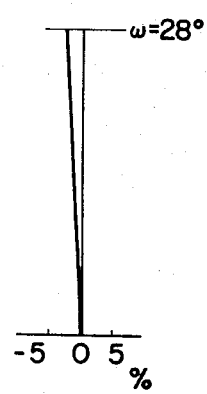
FIG. 15A  
f = 16
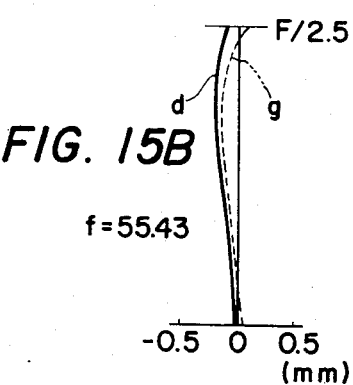
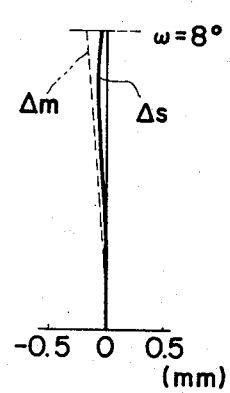
FIG. 15B  
f = 55.43
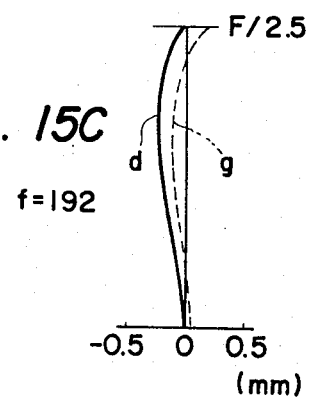
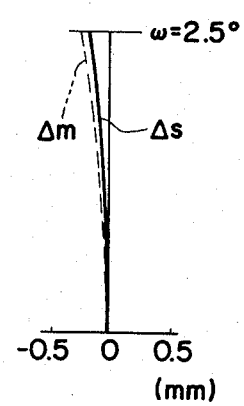
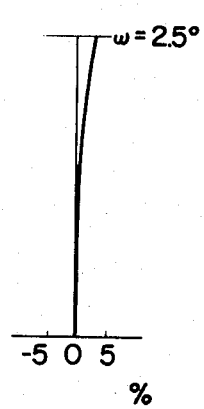
FIG. 15C  
f = 192

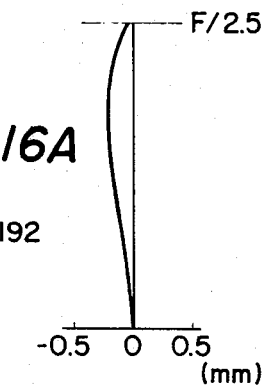
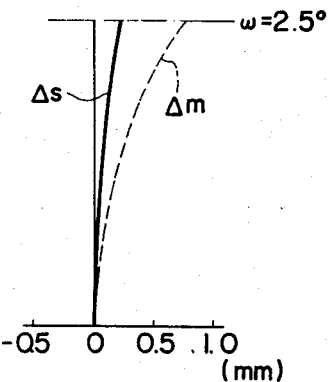
FIG. 16A
f = 192
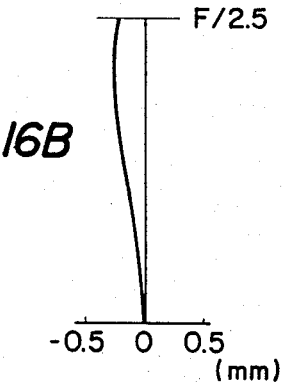
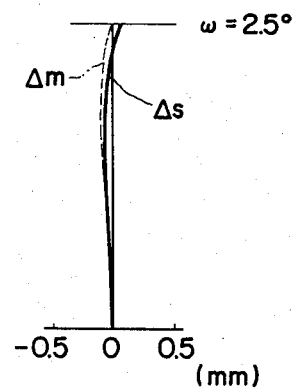
FIG. 16B

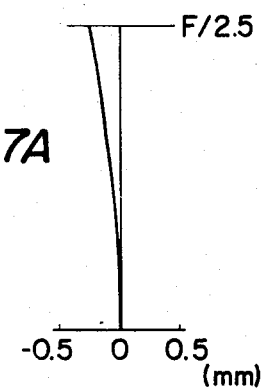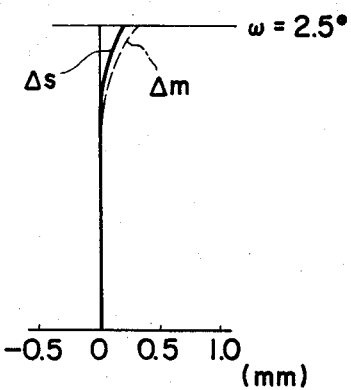
FIG. 17A
f=192
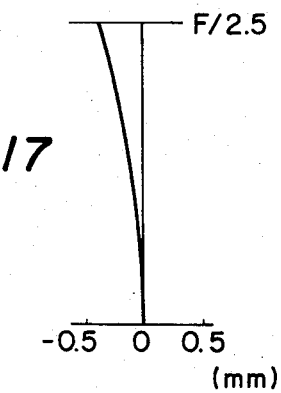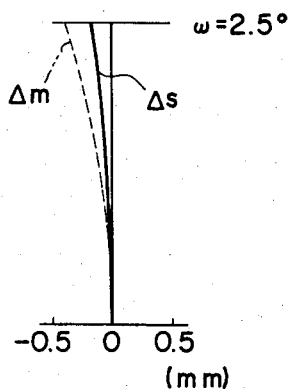
FIG. 17 f=192

ZOOM LENS SYSTEM WITH HIGH ZOOMING RATIO

BACKGROUND OF THE INVENTION a. Field of the invention ν

The present invention relates to a zooming lens system and, more particularly, to a zooming lens system with high zooming ratio of 1:12.

b. Description of the prior art (ν

For most of known zoom lens systems with high zooming ratio, the overall length of the lens system is long and diameter of the front lens is large. So, most of those zoom lens systems are large in size. Besides, for known zoom lens systems with high zooming ratio, aberrations are considerably aggravated when the distance to the object to be photographed is largely varied from the distance to the object adopted when the lens system is designed, Especially, in the teleposition, aggravation of aberrations when the distance to the object is varied is very large.

SUMMARY OF THE INVENTION

It is, therefore, a primary object of the present invention to provide a compact zoom lens system with high zooming ratio for which the range of focal length is 16 to 192, i.e., the zooming ratio is 1:12, and aperture ratio is large.

Another object of the present invention is to provide a zoom lens system with high zooming ratio arranged to prevent aggravation of image in close-up photographing.

The basic configuration of the zoom lens system according to the present invention is as described below. That is, the zoom lens system according to the present invention comprises a focusing lens group having positive power, a variator lens group having negative power, a compensator lens group having negative power, and an erector lens group having positive power. As respective lens groups are arranged to have powers as described in the above, the required distance between the variator lens group and compensator lens group at the time of zooming is limited to a comparatively small value. Therefore, the zoom lens system according to the present invention is arranged so that the overall length is comparatively short and diameter of front lens is comparatively small. Besides, focal lengths of respective lens groups are 118 to 127 for the focusing lens group, −18 to −21 for the variator lens group, −76 to −82 for the compensator lens group, 47 to 52 for the erector lens group, and 47 to 49 for the master lens group. In the zoom lens system according to the present invention, the focusing lens group comprises three positive lens components and one negative lens component, the variator lens group comprises three negative lens components of cemented doublets or single lenses, the compensator lens group comprises a negative cemented doublet, the erector lens group comprises two positive lens components, and the master lens group comprises a first lens component having positive refractive power, a second lens component having negative refractive power, a third lens component of positive lens and a fourth lens component of positive lens. Besides, the zoom lens system according to the present invention satisfies the following condition:

$$1.45 < N_a < 1.65 \quad (1)$$

$$1.58 < N_b < 1.82 \quad (2)$$

$$|3f_v| < |R_a| \quad (3)$$

$$0.05f_M < D_a < 0.36f_M \quad (4)$$

$$0.24f_M < D_b + D_c < 0.6f_M \quad (5)$$

wherein reference symbol $N_a$ represents refractive indices of three positive lenses in the focusing lens group (but, refractive indices of the three lenses are not always equal), reference symbol $N_b$ represents refractive indices of two lenses on the object side in the variator lens group (but, refractive indices of the two lenses are not always equal and, when one or both of those lenses are cemented doublet lenses, $N_b$ represents refractive indices of negative lenses constituting those cemented doublet lenses), reference symbol $R_a$ represents the radius of curvature of the lens surface closest to the image side in the variator lens group, reference symbol $D_a$ represents the thickness of the thick lens constituting the first lens component in the master lens group, reference symbol $D_b$ represents the airspace between the first and second lens components in the master lens group, reference symbol $D_c$ represents the airspace between the second and third lens components in the master lens group, reference symbol $f_v$ represents the focal length of the variator lens group, and reference symbol $f_M$ represents the focal length of the master lens group.

The zoom lens system according to the present invention has basic lens configuration as described in the above and, therefore, the focusing lens group comprises three positive lenses and one negative lens. In the focusing lens group, those lenses may be arranged either in the order of the positive lens, negative lens, positive lens and positive lens from the objective side, in the order of the positive lens, positive lens, negative lens and positive lens from the object side, or in the order of the negative lens, positive lens, positive lens and positive lens from the object side. In all of the above three cases, the focusing lens group is to be arranged to satisfy the condition (1). By the above arrangement, the focusing lens group in combination with the variator lens group and other lens groups constitutes the zoom lens system capable of attaining the object of the present invention.

Now, the meaning of the above-mentioned respective conditions is described in detail in the following.

The condition (1) is to define the refractive indices of positive lenses in the focusing lens group. For positive lenses in this kind of focusing lens group, it is generally advantageous for correction of spherical aberration and chromatic aberration when materials of high refractive indices and high dispersion are used for those positive lenses. In zoom lens systems, however, negative lenses of strong negative powers are used in the variator lens group and compensator lens group which are to be moved for the purpose of zooming and, therefore, negative power of the lens system as a whole becomes strong, Petzval's sum becomes a negative value and large curvature of field occurs. If the positive lenses in the focusing lens group have high refractive indices in addition to the above, Petzval's sum of the lens system becomes a negative value of still larger absolute value and, consequently, it becomes impossible to correct curvature of field favourably by the other lenses. Due to the above-mentioned reason, in the present invention, the upper limit as shown in the condition (1) is given to refractive indices of the positive lenses in the focusing lens group. When, on the other hand, refractive indices of these positive lenses are low, it may be advantageous as far as Petzval's sum is concerned. However, it becomes difficult to correct spherical aberration favourably. Moreover, it becomes necessary to make radii of curvature of respective lens surfaces small and offaxial aberrations will increase. To prevent the above, the lower limit of refractive indices is given as shown in the condition (1).

The condition (2) relates to correction of aberrations of the variator lens group and is established for the purpose of correcting spherical aberration which has not been favourably corrected by the focusing lens group. If the refractive index of either negative lens, out of the two negative lenses arranged on the object side in the variator lens group (the two negative lenses constituting the cemented double lenses when one or both of those lenses are cemented doublet lenses), becomes smaller than the lower limit of the condition (2), it becomes impossible to correct spherical aberration favourably. If the above-mentioned refractive index becomes larger than the upper limit of the condition (2), Petzval's sum becomes negative, curvature of field will be aggravated and it becomes impossible to favourably correct it by the other lenses.

The condition (3) is to limit the exit angles of oblique rays which go out from the variator lens group in order to prevent offaxial aberrations to be caused by the variator lens group and also to minimize offaxial aberrations to be caused by respective lenses in rear of the variator lens group. The above-mentioned correcting effect is attained by limiting the radius of curvature $R_a$ of the lens surface, which is closest to the image side in the variator lens group, to a value within the range defined by the condition (3). If $R_a$ does not satisfy the condition (3), the radius of curvature of the above-mentioned lens surface becomes small, aberrations caused by this surface increases and it becomes impossible to favourably correct them by the other lenses.

Generally, in the zooming lens groups (variator lens group, compensator lens group, etc.) of a zoom lens system, there are such lens groups which have strong negative powers and, therefore, spherical aberration of the zooming lens groups as a whole generally becomes considerably undercorrected. Therefore, it is necessary to balance spherical aberration of the lens system as a whole by arranging so that spherical aberration of the master lens group is overcorrected to the extent that the above-mentioned undercorrection of spherical aberration is offset. The condition (4) is established for the purpose of overcorrecting spherical aberration of the master lens group. That is, it is so arranged that spherical aberration of the master lens group is overcorrected by adopting a positive lens of large thickness in the first lens component in the master lens group. If, however, a lens of too large thickness is used, offaxial aberrations will be caused though it may be advantageous for correction of spherical aberration. Therefore, it is necessary to arrange so that the thickness $D_a$ of the thick lens in the first lens component will not exceed the upper limit of the condition (4). If, on the contrary, $D_a$ becomes smaller than the lower limit of the condition (4), spherical aberration will be undercorrected and it becomes impossible to favourably balance spherical aberration of the lens system as a whole.

Due to the fact that there are such lens groups having strong negative powers in the zooming lens groups as described in the above, Petzval's sum of the zooming lens groups as a whole becomes a negative value of large absolute value in the same way as spherical aberration of the zooming lens groups as a whole is undercorrected. Therefore, it is necessary to offset the above by arranging so that Petzval's sum of the master lens group becomes a large positive value. For this purpose, the master lens group of the zoom lens system according to the present invention is arranged as a Petzval type lens group having large airspaces between lens components constituting it. To obtain the above-mentioned offsetting effect for Petzval's sum, it is preferable to arrange so that the sum $D_b + D_c$ of the airspace $D_b$ between the first and second lens components in the master lens group and airspace $D_c$ between the second and third lens components becomes large. However, in order to obtain the back focal length of adequate value and to favourably correct the other aberrations, especially coma, it is necessary to arrange so that the sum $D_b + D_c$ does not exceed the upper limit of the condition (5). If, on the other hand, the sum $D_b + D_c$ becomes smaller than the lower limit of the condition (5), it becomes impossible to favourably balance Petzval's sum of the lens system as a whole due to the reason described in the above and, consequently, curvature of field will be aggravated.

As explained so far, the zoom lens system having the afore-mentioned lens configuration and satisfying the above conditions is capable of attaining the object of the present invention. When, however, respective conditions described below are further satisfied, it is possible to obtain a more favourable zoom lens system.

For the negative lens in the focusing lens group, it is not preferable to make radii of curvature of its surfaces small because small radii of curvature are not advantageous for obtaining Petzval's sum of large positive value for the focusing lens group and for making the lens system as a whole compact. Therefore, for this negative lens, it is preferable to make its refractive index as high as possible, i.e., 1.75 or more. Besides, the variator lens group has tendency to cause aberrations especially for offaxial rays because the amount of its movement at the time of zooming is large. Therefore, it is preferable to make radii of curvature of respective surfaces of respective lenses, which constitute the variator lens group, as large as possible so that respective lens surfaces in the variator lens group will not have large angles of refraction for oblique rays. Moreover, when radii of curvature of respective lens surfaces are large, it is possible to make airspaces between respective lens components small. This is preferable also from the point of view that it is then possible to make the lens system as a whole compact. For this purpose, it is preferable to use materials of high refractive indices for respective lenses in the variator lens group. When one or more cemented doublet lenses are used as lens components in the variator lens group, it is preferable to use materials of high refractive indices for the positive lenses constituting those cemented doublet lenses and, especially, it is more preferable to make refractive indices of those positive lenses 1.75 or more.

In the focusing lens group constituting the zoom lens system according to the present invention, materials of high dispersion are used for the three positive lenses and material of low dispersion is used for the negative lens so that chromatic aberration is thereby prevented, especially, chromatic aberration in the tele-position is thereby prevented. To favourably correct lateral chromatic aberration and to favourably balance chromatic aberration caused by the focusing lens group with chromatic aberration to be caused by the variator lens group arranged in rear of the focusing lens group, it is preferable to select Abbe's numbers $v_a$ of the three positive lenses constituting the focusing lens group within the range defined by the condition (6) shown below.

$$57 < v_a < 71 \tag{6}$$

If Abbe's number $v_a$ of any lens out of the three positive lenses in the focusing lens group becomes larger than the upper limit of the condition (6), lateral chromatic aberration especially in the tele-position becomes large though it may be convenient for correction of longitudinal chromatic aberration. If the above-mentioned Abbe's number becomes smaller than the lower limit of the condition (6), it becomes impossible to correct longitudinal chromatic aberration favourably.

For correction of chromatic aberration of the variator lens group, it is necessary to take correction of longitudinal chromatic aberration and lateral chromatic aberration of the focusing lens group into consideration. To correct chromatic aberration of the variator lens group more favourably, it is preferable to select Abbe's numbers $v_b$ of the two negative lenses on the object side in the variator lens group (the two negative lenses constituting the cement doublet lenses when one or both of those lenses are cemented doublet lenses) within the range defined by the condition (7) shown below.

$$38 < v_b < 62 \tag{7}$$

If Abbe's number $v_b$ of either lens out of the above two negative lenses does not satisfy the condition (7), longitudinal chromatic aberration and lateral chromatic aberration cannot be corrected in well balanced state.

For the lens closest to the image side in the variator lens group, it is preferable to make its refractive power not so strong. If its refractive power is strong, aberrations will be caused when the variator lens group is moved for the purpose of zooming and, moreover, it becomes necessary to arrange so that the lens groups in rear of the variator lens group have very strong refractive powers. Due to the above-mentioned reason, it is preferable to select the focal length $f_a$ of the lens closest to the image side in the variator lens group within the range defined by the condition (8) shown below.

$$5|f_V| < |f_a| < 20|f_V| \tag{8}$$

Generally, for zoom lens systems, the degree of freedom is limited by correction of aberrations other than distortion and, therefore, it is difficult to correct distortion favourably. For the zoom lens system according to the present invention, it is so arranged that distortion is corrected by means of the positive lens positioned closest to the object side in the focusing lens group and/or positive lens positioned just on the image side of the negative in the focusing lens group. When surfaces on the image side of these positive lenses are made concave toward the object side and radii of curvature of these surfaces are made small, distortion is corrected more favourably when the smaller the radii of curvature are. On the other hand, when these surfaces are made convex toward the object side, it is possible to favourably correct distortion by the other lens surfaces when radii of curvature of these surfaces are not small and it is all right for practical use. Besides, when these surfaces are convex toward the object side, it is possible to make thicknesses of lenses comparatively small and to make the diameter of the front lens small. Therefore, it is advantageous as the lens system as a whole can be arranged compactly. Due to the above-mentioned reason, it is preferable to select the radii of curvature $R_a$ of the surfaces on the image side of the positive lens positioned closest to the object side in the focusing lens group and/or of the positive lens positioned just on the image side of the negative lens in the focusing lens group so that the following condition (9) is satisfied.

$$-0.65/f_F < 1/R_a < 0.05/f_F \tag{9}$$

When $1/R_a$ in the condition (9) becomes larger than the upper limit, these surfaces become convex toward the object side and, moreover, radii of curvature of these surfaces become small. Therefore, it is impossible to correct distortion favourably. When $1/R_a$ becomes smaller than the lower limit, these surfaces become concave toward the object side and radii of curvature of these surfaces become small. Therefore, it is advantageous for correction of distortion. However, the other aberrations will be caused and it becomes impossible to favourably correct them in well-balanced state.

Generally, photographic lens systems are designed so that its aberrations are favourably corrected when it is focused on an object at infinite distance. When, therefore, the object distance (the distance to the object to be photographed) is varied, aberrations vary from those when the lens system is designed. Especially when the object distance is largely varied in order to photograph an object at a very short distance, aberrations are aggravated considerably. On the contrary, when a photographing lens system is designed so that its aberrations are favourably corrected when it is focused on an object at a very short distance, aberrations are aggravated when photographing an object at the other distances including infinite distance. As explained in the above, the image obtained by a photographic lens system generally becomes somewhat unfavourable when photographing an object at a distance other than the design object distance (the distance to the object to be photographed for which the lens system is designed), i.e., when photographing by a magnification other than the design magnification (the magnification for which the lens system is designed). This phenomenon is more conspicuous in case of asymmetrical lens systems. Moreover, in case of zoom lens systems with high zooming ratio like the lens system according to the present invention, the image obtained by photographing in the tele-position becomes more unfavourable, when the object distance is varied, compared with the image obtained by photographing in the wide position because the magnification in the tele-position is larger compared with the magnification in the wide-position even when the object distance is the same.

To explain more particularly, zoom lens systems are focused, for example, by providing a focusing lens group constituting the zoom lens system and by moving the focusing lens group as in case of the zoom lens system according to the present invention. When focusing such zoom lens system, the amount of movement of the focusing lens group required for focusing becomes large when the object distance is largely becomes large when the object distance is largely varied from the design object distance. Besides, for zoom lens systems, the focal length of the lens system is varied by moving the variator lens group which is arranged just in rear of the focusing lens group.

When putting the zoom lens system to the teleposition, the variator lens group is generally moved in the direction in which the airspace between the focusing lens group and variator lens group becomes wider. Therefore, positions of offaxial rays where they pass through lenses are considerably different from positions of paraxial rays where they pass through lenses. Consequently, offaxial aberrations are largely varied when the lens system is put to the tele-position and are aggravated considerably. At that time, astigmatism and curvature of field are aggravated chiefly.

Therefore, the zoom lens system according to the present invention is arranged to prevent the above-mentioned aggravation of aberration by varying the airspace ($d_2$, $d_4$ or $d_6$) between lenses in the portion where paraxial rays are parallel with the optical axis of the lens system and offaxial rays are at large angles in respect to the optical axis. In this case, the above-mentioned variation of airspace has almost no influence on paraxial aberrations because paraxial rays are parallel with the optical axis in that portion. On the contrary, astigmatism which is offaxial aberration largely varies according to variation of airspace and, therefore, it is possible to favourably correct astigmatism in well-balanced state.

In other words, for the zoom lens system according to the present invention, the above-mentioned airspace to be varied is selected so that the following conditions are satisfied.

$$1.5 f_F < |f_{IB}| \qquad (10)$$

$$f_F < |f_I| < 3 f_F \qquad (11)$$

In the above, reference symbol $f_F$ represents the focal length of the focusing lens group, reference symbol $f_I$ represents the focal length of the movable lens group I consisting of the lens or lenses arranged on the object side of the above-mentioned airspace to be varied, and reference symbol $f_{IB}$ represents the back focal length of the above-mentioned movable lens group I.

Out of the above conditions, the condition (10) is to make paraxial rays in the above-mentioned airspace as far as possible parallel with the optical axis in order to minimize variation of paraxial aberrations when the airspace is varied. That is, the condition (10) means to arrange so that the back focal point of the movable lens group I, which is positioned in front of the above-mentioned airspace, comes to a position as far as possible distant from the lens group I. When the back focal length $f_{IB}$ is 1.5 times or more of the focal length $f_F$ of the focusing lens group, variation of paraxial aberrations when the above-mentioned airspace is varied is limited to the degree which is negligible in practical use.

The condition (11) relates to the power of the lens group I. The smaller the power of the lens group I, the more favourable for parallelism of paraxial rays in the above-mentioned airspace to be varied. When, however, the power of the lens group I is too small, it is impossible to vary offaxial rays when the above-mentioned airspace is varied. That is, to refract offaxial rays so that some influence is given to offaxial rays when the airspace is varied and the above-mentioned effect for preventing aggravation of aberrations is attained, the power of the lens group I should be made large to some extent. Therefore, it is necessary to select the focal length $f_I$ of the lens group I within the range defined by the condition (11). If $f_I$ becomes larger than the upper limit of the condition (11) and the power of the lens group I becomes smaller than ⅓ of the power of the focusing lens group as a whole, the power of the lens group I becomes too weak. Therefore, to attain the object of the present invention, the required amount of movement of the lens group I becomes large, i.e., the amount of variation of the above-mentioned airspace becomes large. If, however, the amount of variation of that airspace is large as described in the above, variation of the airspace will have influence on paraxial aberrations and this is not preferable. On the other hand, if $f_I$ becomes smaller than the lower limit, the power of the lens group I becomes too strong. Therefore, offaxial aberrations are varied too much when the above-mentioned airspace is varied and it is impossible to obtain stable correcting effect for aberrations.

Besides, variation of paraxial aberrations to be caused when the above-mentioned airspace is varied becomes small when the power of the lens group I is smaller than the power of the other lens group constituting the focusing lens group, i.e., the lens group II which consists of the lens or lenses arranged on the image side of the above-mentioned airspace. Therefore, it is preferable to select the focal length $f_{II}$ of the lens group II so that it becomes $|f_{II}| < |f_I|$.

BRIEF DESCRIPTION OF THE DRAWINGS

FIGS. 6A, 6B and 6C respectively show graphs illustrating aberration curves of Embodiment 1 when $f$ is respectively $f = 16$, $f = 55.43$ and $f = 192$;

FIGS. 7A, 7B and 7C respectively show graphs illustrating aberration curves of Embodiment 2 when $f$ is respectively $f = 16$, $f = 55.43$ $f = 192$;

FIGS. 8A, 8B and 8C respectively show graphs illustrating aberration curves of Embodiment 3 when $f$ is respectively $f = 16$, $f = 55.43$ and $f = 192$;

FIGS. 9A 9B and 9C respectively show graphs illustrating aberration curves of Embodiment 4 when $f$ is respectively $f = 16$, $f = 55.43$ and $f = 192$;

FIGS. 10A, 10B and 10C respectively show graphs illustrating aberration curves of Embodiment 5 when $f$ is respectively f = 16, f = 55.43 and f = 192;

FIGS. 11A, 11B and 11C respectively show graphs illustrating aberration curves of Embodiment 6 when $f$ is respectively $f = 16$, $f = 55.43$ and $f = 192$;

FIGS. 12A, 12B and 12C respectively show graphs illustrating aberration curves of Embodiment 7 when $f$ is respectively $f = 16$, $f = 55.43$ and $f = 192$;

FIGS. 13A, 13B and 13C respectively show graphs illustrating aberration curves of Embodiment 8 when $f$ is respectively $f = 16$, $f = 55.43$ and $f = 192$;

FIGS. 14A, 14B and 14C respectively show graphs illustrating aberration curves of Embodiment 9 when $f$ is respectively $f = 16$, $f = 55.43$ and $f = 192$;

FIGS. 15A, 15B and 15C respectively show graphs illustrating aberration curves of Embodiment 10 when $f$ is respectively $f = 16$, $f = 55.43$ and $f = 192$;

FIG. 16A shows graphs illustrating spherical aberration and astigmatism of Embodiment 1 before correction when the object distance is 2,000 mm;

FIG. 16B shows graphs illustrating spherical aberration and astigmatism of Embodiment 1 after correction when the object distance is 2,000 mm.

FIG. 17A shows graphs illustrating spherical aberration and astigmatism of Embodiment 8 before correction when the object distance is 2,000 mm;

FIG. 17B shows graphs illustrating spherical aberration and astigmatism of Embodiment 8 after correction when the object distance is 2,000 mm;

DETAILED DESCRIPTION OF THE PREFERRED EMBODIMENTS

Figure 1:
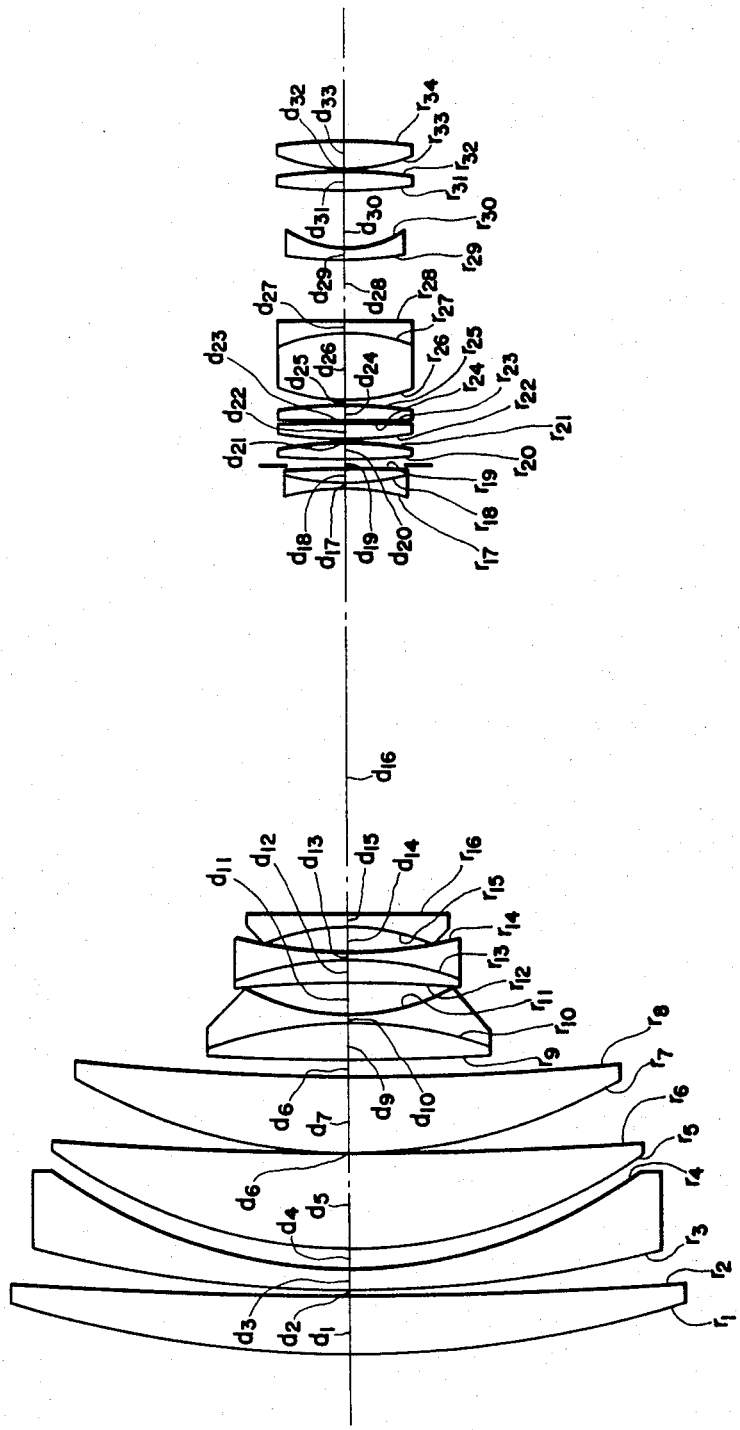
FIGS. 1 through 5 respectively show sectional views of respective embodiments of the zoom lens system according to the present invention.

Preferred embodiments of the zoom lens system with high zooming ratio according to the present invention explained in the above are as shown below.

Embodiment 1

$r_1 = 158.296$
  $d_1 = 11.5$   $n_1 = 1.623$   $\nu_1 = 58.1$
$r_2 = 2197.098$
  $d_2 = 0.2$
$r_3 = 213.115$
  $d_3 = 3.0$   $n_2 = 1.805$   $\nu_2 = 25.4$
$r_4 = 85.546$
  $d_4 = 3.5$
$r_5 = 89.756$
  $d_5 = 17.0$   $n_3 = 1.623$   $\nu_3 = 58.1$
$r_6 = 758.509$
  $d_6 = 1.2$
$r_7 = 99.704$
  $d_7 = 9.0$   $n_4 = 1.623$   $\nu_4 = 58.1$
$r_8 = 316.846$
  $d_8$ variable
$r_9 = 429.751$
  $d_9 = 6.0$   $n_5 = 1.805$   $\nu_5 = 25.4$
$r_{10} = -78.647$
  $d_{10} = 1.8$   $n_6 = 1.697$   $\nu_6 = 55.5$
$r_{11} = 37.297$
  $d_{11} = 4.8$
$r_{12} = -223.383$
  $d_{12} = 3.8$   $n_7 = 1.805$   $\nu_7 = 25.4$
$r_{13} = -62.115$
  $d_{13} = 1.2$   $n_8 = 1.697$   $\nu_8 = 55.5$
$r_{14} = 65.013$
  $d_{14} = 4.6$
$r_{15} = -36.284$
  $d_{15} = 1.6$   $n_9 = 1.620$   $\nu_9 = 60.3$
$r_{16} = -469.412$
  $d_{16}$ variable
$r_{17} = -41.846$
  $d_{17} = 0.8$   $n_{10} = 1.560$   $\nu_{10} = 61.1$
$r_{18} = 40.239$
  $d_{18} = 2.4$   $n_{11} = 1.548$   $\nu_{11} = 45.8$
$r_{19} = -753.479$
  $d_{19}$ variable
$r_{20} = 196.376$
  $d_{20} = 2.8$   $n_{12} = 1.516$   $\nu_{12} = 64.2$
$r_{21} = -64.862$
  $d_{21} = 0.2$
$r_{22} = 77.367$
  $d_{22} = 2.5$   $n_{13} = 1.516$   $\nu_{13} = 64.2$
$r_{23} = -171.623$
  $d_{23} = 0.6$
$r_{24} = 1114.209$
  $d_{24} = 2.5$   $n_{14} = 1.516$   $\nu_{14} = 64.2$
$r_{25} = -118.819$
  $d_{25} = 0.2$
$r_{26} = 29.349$
  $d_{26} = 18.0$   $n_{15} = 1.515$   $\nu_{15} = 54.7$
$r_{27} = -28.100$
  $d_{27} = 1.8$   $n_{16} = 1.755$   $\nu_{16} = 27.5$
$r_{28} = 1438.933$
  $d_{28} = 10.8$
$r_{29} = 72.293$
  $d_{29} = 1.8$   $n_{17} = 1.755$   $\nu_{17} = 27.5$
$r_{30} = 18.709$
  $d_{30} = 9.5$
$r_{31} = 63.955$
  $d_{31} = 3.0$   $n_{18} = 1.541$   $\nu_{18} = 47.2$
$r_{32} = -200.489$
  $d_{32} = 0.2$
$r_{33} = 32.745$
  $d_{33} = 4.0$   $n_{19} = 1.541$   $\nu_{19} = 47.2$
$r_{34} = -59.973$ $f = 16 \sim 192,$  $f_F = 121.0,$  $f_V = -20.5$
$f_c = -77.44,$  $f_E = 49.8,$  $f_M = 53.3$

| | $d_8$ | $d_{16}$ | $d_{19}$ |
|---|---|---|---|
| $f = 16$ | 1.63 | 71.05 | 1.37 |
| $f = 55.43$ | 45.3 | 16.32 | 12.43 |
| $f = 192$ | 66.72 | 5.96 | 1.37 |

Embodiment 2

$r_1 = 133.100$
  $d_1 = 14.000$   $n_1 = 1.56873$   $\nu_1 = 63.16$
$r_2 = 933.228$
  $d_2 = 0.200$
$r_3 = 168.206$
  $d_3 = 3.0$   $n_2 = 1.78472$   $\nu_2 = 25.71$
$r_4 = 88.024$
  $d_4 = 4.0$
$r_5 = 102.995$
  $d_5 = 12.5$   $n_3 = 1.48749$   $\nu_3 = 70.15$
$r_6 = 707.554$
  $d_6 = 0.2$
$r_7 = 84.944$
  $d_7 = 12.5$   $n_4 = 1.48749$   $\nu_4 = 70.15$
$r_8 = 431.464$
  $d_8$ variable
$r_9 = 193.259$
  $d_9 = 8.0$   $n_5 = 1.80518$   $\nu_5 = 25.43$
$r_{10} = -79.919$
  $d_{10} = 1.8$   $n_6 = 1.75700$   $\nu_6 = 47.87$
$r_{11} = 42.365$
  $d_{11} = 6.4$
$r_{12} = -415.180$
  $d_{12} = 3.2$   $n_7 = 1.80518$   $\nu_7 = 25.43$
$r_{13} = -60.449$
  $d_{13} = 1.4$   $n_8 = 1.75700$   $\nu_8 = 47.87$
$r_{14} = 73.901$
  $d_{14} = 5.2$
$r_{15} = -38.899$
  $d_{15} = 1.4$   $n_9 = 1.62299$   $\nu_9 = 58.14$
$r_{16} = 194.328$
  $d_{16}$ variable
$r_{17} = -39.838$
  $d_{17} = 0.8$   $n_{10} = 1.55963$   $\nu_{10} = 61.14$
$r_{18} = 34.340$
  $d_{18} = 2.4$   $n_{11} = 1.54072$   $\nu_{11} = 47.20$
$r_{19} = -243.527$
  $d_{19}$ variable
$r_{20} = 274.360$
  $d_{20} = 2.5$   $n_{12} = 1.51633$   $\nu_{12} = 64.15$
$r_{21} = -56.628$
  $d_{21} = 0.1$
$r_{22} = 93.570$
  $d_{22} = 2.5$   $n_{13} = 1.51633$   $\nu_{13} = 64.15$
$r_{23} = -151.963$
  $d_{23} = 0.432$
$r_{24} = 156.152$
  $d_{24} = 4.0$   $n_{14} = 1.51633$   $\nu_{14} = 64.15$
$r_{25} = -1290.335$
  $d_{25} = 0.2$
$r_{26} = 21.067$
  $d_{26} = 8.5$   $n_{15} = 1.51633$   $\nu_{15} = 64.15$
$r_{27} = -31.823$
  $d_{27} = 1.8$   $n_{16} = 1.74400$   $\nu_{16} = 44.78$
$r_{28} = 3069.674$
  $d_{28} = 8.0$
$r_{29} = 58.260$
  $d_{29} = 1.8$   $n_{17} = 1.76182$   $\nu_{17} = 26.55$
$r_{30} = 16.565$
  $d_{30} = 5.0$
$r_{31} = 109.745$
  $d_{31} = 4.5$   $n_{18} = 1.51633$   $\nu_{18} = 64.15$
$r_{32} = -61.884$
  $d_{32} = 0.2$
$r_{33} = 24.680$
  $d_{33} = 4.5$   $n_{19} = 1.51633$   $\nu_{19} = 64.15$
$r_{34} = 166.289$ $f = 16 \sim 192,$  $f_F = 127.000,$  $f_V = -20.500$
$f_c = -81.200,$  $f_E = 50.613,$  $f_M = 49.019$

| | $d_8$ | $d_{16}$ | $d_{19}$ |
|---|---|---|---|
| $f = 16$ | 0.8 | 67.52 | 1.74 |
| $f = 55.43$ | 44.1 | 11.35 | 14.63 |
| $f = 192$ | 65.9 | 2.43 | 1.74 |

Embodiment 3

$r_1 = 114.335$
  $d_1 = 12.0$   $n_1 = 1.60311$   $\nu_1 = 60.70$
$r_2 = 736.861$

-continued

| | | |
|---|---|---|
| $d_2 = 0.2$ | | |
| $r_3 = 196.827$ | | |
| $d_3 = 3.0$ | $n_2 = 1.80518$ | $\nu_2 = 25.43$ |
| $r_4 = 83.472$ | | |
| $d_4 = 3.5$ | | |
| $r_5 = 106.493$ | | |
| $d_5 = 12.0$ | $n_3 = 1.60311$ | $\nu_3 = 60.70$ |
| $r_6 = 570.408$ | | |
| $d_6 = 0.2$ | | |
| $r_7 = 96.660$ | | |
| $d_7 = 10.2$ | $n_4 = 1.60311$ | $\nu_4 = 60.70$ |
| $r_8 = 430.980$ | | |
| $d_8$ variable | | |
| $r_9 = 204.944$ | | |
| $d_9 = 6.2$ | $n_5 = 1.80518$ | $\nu_5 = 25.43$ |
| $r_{10} = -71.740$ | | |
| $d_{10} = 1.5$ | $n_6 = 1.65160$ | $\nu_6 = 58.67$ |
| $r_{11} = 36.157$ | | |
| $d_{11} = 5.0$ | | |
| $r_{12} = -148.933$ | | |
| $d_{12} = 2.5$ | $n_7 = 1.80518$ | $\nu_7 = 25.43$ |
| $r_{13} = -60.792$ | | |
| $d_{13} = 1.2$ | $n_8 = 1.65160$ | $\nu_8 = 58.67$ |
| $r_{14} = 59.371$ | | |
| $d_{14} = 4.5$ | | |
| $r_{15} = -33.540$ | | |
| $d_{15} = 1.2$ | $n_9 = 1.62041$ | $\nu_9 = 60.27$ |
| $r_{16} = \infty$ | | |
| $d_{16}$ variable | | |
| $r_{17} = -38.929$ | | |
| $d_{17} = 0.8$ | $n_{10} = 1.55963$ | $\nu_{10} = 61.14$ |
| $r_{18} = 39.004$ | | |
| $d_{18} = 2.4$ | $n_{11} = 1.54814$ | $\nu_{11} = 45.78$ |
| $r_{19} = -302.206$ | | |
| $d_{19}$ variable | | |
| $r_{20} = 165.358$ | | |
| $d_{20} = 2.8$ | $n_{12} = 1.51633$ | $\nu_{12} = 64.15$ |
| $r_{21} = -65.321$ | | |
| $d_{21} = 0.2$ | | |
| $r_{22} = 75.611$ | | |
| $d_{22} = 2.5$ | $n_{13} = 1.51633$ | $\nu_{13} = 64.15$ |
| $r_{23} = -247.013$ | | |
| $d_{23} = 0.419$ | | |
| $r_{24} = 217.139$ | | |
| $d_{24} = 2.5$ | $n_{14} = 1.51633$ | $\nu_{14} = 64.15$ |
| $r_{25} = -386.134$ | | |
| $d_{25} = 0.2$ | | |
| $r_{26} = 26.829$ | | |
| $d_{26} = 13.0$ | $n_{15} = 1.51454$ | $\nu_{15} = 54.69$ |
| $r_{27} = -27.152$ | | |
| $d_{27} = 1.8$ | $n_{16} = 1.75520$ | $\nu_{16} = 27.51$ |
| $r_{28} = -124.632$ | | |
| $d_{28} = 10.8$ | | |
| $r_{29} = 93.905$ | | |
| $d_{29} = 1.8$ | $n_{17} = 1.75520$ | $\nu_{17} = 27.51$ |
| $r_{30} = 16.829$ | | |
| $d_{30} = 9.5$ | | |
| $r_{31} = 69.605$ | | |
| $d_{31} = 3.0$ | $n_{18} = 1.54814$ | $\nu_{18} = 45.78$ |
| $r_{32} = -346.516$ | | |
| $d_{32} = 0.2$ | | |
| $r_{33} = 28.706$ | | |
| $d_{33} = 5.0$ | $n_{19} = 1.54814$ | $\nu_{19} = 45.78$ |
| $r_{34} = -87.603$ | | |

$f = 16 \sim 192$, $f_F = 122.000$, $f_V = -20.700$
$f_C = 78.000$, $f_E = 50.586$, $f_M = 53.553$

| | $d_8$ | $d_{16}$ | $d_{19}$ |
|---|---|---|---|
| $f = 16$ | 0.23 | 72.79 | 1.82 |
| $f = 55.43$ | 44.28 | 17.48 | 13.09 |
| $f = 19.2$ | 65.96 | 7.07 | 1.82 |

Embodiment 4

| | | |
|---|---|---|
| $r_1 = 138.553$ | | |
| $d_1 = 13.0$ | $n_1 = 1.58913$ | $\nu_1 = 61.11$ |
| $r_2 = 857.977$ | | |
| $d_2 = 0.2$ | | |
| $r_3 = 194.829$ | | |
| $d_3 = 3.0$ | $n_2 = 1.80518$ | $\nu_2 = 25.43$ |
| $r_4 = 87.288$ | | |
| $d_4 = 3.5$ | | |
| $r_5 = 99.474$ | | |
| $d_5 = 13.5$ | $n_3 = 1.56873$ | $\nu_3 = 63.16$ |
| $r_6 = 621.5800$ | | |
| $d_6 = 0.2$ | | |
| $r_7 = 95.396$ | | |
| $d_7 = 10.5$ | $n_4 = 1.56873$ | $\nu_4 = 63.16$ |
| $r_8 = 504.051$ | | |
| $d_8$ variable | | |
| $r_9 = 243.444$ | | |
| $d_9 = 6.0$ | $n_5 = 1.80518$ | $\nu_5 = 25.43$ |

-continued

| | | |
|---|---|---|
| $r_{10} = -80.163$ | | |
| $d_{10} = 1.8$ | $n_6 = 1.69350$ | $\nu_6 = 53.34$ |
| $r_{11} = 37.603$ | | |
| $d_{11} = 4.2$ | | |
| $r_{12} = -241.360$ | | |
| $d_{12} = 3.8$ | $n_7 = 1.80518$ | $\nu_7 = 25.43$ |
| $r_{13} = -62.447$ | | |
| $d_{13} = 1.2$ | $n_8 = 1.69350$ | $\nu_8 = 53.34$ |
| $r_{14} = 65.878$ | | |
| $d_{14} = 4.5$ | | |
| $r_{15} = 37.701$ | | |
| $d_{15} = 1.2$ | $n_9 = 1.62041$ | $\nu_9 = 60.27$ |
| $r_{16} = 309.752$ | | |
| $d_{16}$ variable | | |
| $r_{17} = -36.678$ | | |
| $d_{17} = 0.8$ | $n_{10} = 1.55963$ | $\nu_{10} = 61.14$ |
| $r_{18} = 35.175$ | | |
| $d_{18} = 2.4$ | $n_{11} = 1.54814$ | $\nu_{11} = 45.78$ |
| $r_{19} = -198.614$ | | |
| $d_{19}$ variable | | |
| $r_{20} = 194.216$ | | |
| $d_{20} = 2.8$ | $n_{12} = 1.51633$ | $\nu_{12} = 64.15$ |
| $r_{21} = -62.779$ | | |
| $d_{21} = 0.2$ | | |
| $r_{22} = 77.005$ | | |
| $d_{22} = 2.5$ | $n_{13} = 1.51633$ | $\nu_{13} = 64.15$ |
| $r_{23} = -218.172$ | | |
| $d_{23} = 0.061$ | | |
| $r_{24} = 171.270$ | | |
| $d_{24} = 2.5$ | $n_{14} = 1.51633$ | $\nu_{14} = 64.15$ |
| $r_{25} = -346.014$ | | |
| $d_{25} = 0.2$ | | |
| $r_{26} = 26.364$ | | |
| $d_{26} = 11.0$ | $n_{15} = 1.51454$ | $\nu_{15} = 54.69$ |
| $r_{27} = -28.399$ | | |
| $d_{27} = 1.8$ | $n_{16} = 1.75520$ | $\nu_{16} = 27.51$ |
| $r_{28} = -122.545$ | | |
| $d_{28} = 10.8$ | | |
| $r_{29} = 97.359$ | | |
| $d_{29} = 1.8$ | $n_{17} = 1.75520$ | $\nu_{17} = 27.51$ |
| $r_{30} = 16.704$ | | |
| $d_{30} = 9.5$ | | |
| $r_{31} = 68.984$ | | |
| $d_{31} = 3.5$ | $n_{18} = 1.54814$ | $\nu_{18} = 45.78$ |
| $r_{32} = -383.822$ | | |
| $d_{32} = 0.2$ | | |
| $r_{33} = 27.419$ | | |
| $d_{33} = 4.5$ | $n_{19} = 1.54814$ | $\nu_{19} = 45.78$ |
| $r_{34} = -119.733$ | | |

$f = 16 \sim 192$ $f_F = 123.00$ $f_V = -20.500$
$f_C = -78.500$ $f_E = 50.551$ $f_M = 52.662$

| | $d_8$ | $d_{16}$ | $d_{19}$ |
|---|---|---|---|
| $f = 16$ | 2.65 | 72.10 | 1.59 |
| $f = 55.43$ | 46.28 | 17.08 | 12.98 |
| $f = 192$ | 67.74 | 7.01 | 1.59 |

Embodiment 5

| | | |
|---|---|---|
| $r_1 = 222.863$ | | |
| $d_1 = 12.0$ | $n_1 = 1.56873$ | $\nu_1 = 63.16$ |
| $r_2 = -324.366$ | | |
| $d_2 = 0.2$ | | |
| $r_3 = 163.746$ | | |
| $d_3 = 10.5$ | $n_2 = 1.56873$ | $\nu_2 = 63.16$ |
| $r_4 = -1106.264$ | | |
| $d_4 = 3.5$ | | |
| $r_5 = -247.772$ | | |
| $d_5 = 3.5$ | $n_3 = 1.76182$ | $\nu_3 = 26.55$ |
| $r_6 = 341.708$ | | |
| $d_6 = 0.2$ | | |
| $r_7 = 94.481$ | | |
| $d_7 = 13.0$ | $n_4 = 1.48749$ | $\nu_4 = 70.15$ |
| $r_8 = -816.610$ | | |
| $d_8$ variable | | |
| $r_9 = -142.872$ | | |
| $d_9 = 1.0$ | $n_5 = 1.65844$ | $\nu_5 = 50.90$ |
| $r_{10} = 38.188$ | | |
| $d_{10} = 6.0$ | | |
| $r_{11} = 238.915$ | | |
| $d_{11} = 1.0$ | $n_6 = 1.6544$ | $\nu_6 = 50.90$ |
| $r_{12} = 28.492$ | | |
| $d_{12} = 6.5$ | | |
| $r_{13} = -77.070$ | | |
| $d_{13} = 1.0$ | $n_7 = 1.51633$ | $\nu_7 = 64.15$ |
| $r_{14} = 24.079$ | | |
| $d_{14} = 4.0$ | $n_8 = 1.78472$ | $\nu_8 = 25.71$ |
| $r_{15} = 106.026$ | | |
| $d_{15}$ variable | | |
| $r_{16} = -38.151$ | | |
| $d_{16} = 1.1$ | $n_9 = 1.51823$ | $\nu_9 = 58.96$ |
| $r_{17} = 29.987$ | | |

-continued

| | | |
|---|---|---|
| $d_{17} = 2.8$ | $n_{10} = 1.54072$ | $\nu_{10} = 47.20$ |
| $r_{18} = 2871.455$ | | |
| $d_{18}$ variable | | |
| $r_{19} = 304.397$ | | |
| $d_{19} = 3.2$ | $n_{11} = 1.48749$ | $\nu_{11} = 70.15$ |
| $r_{20} = -48.494$ | | |
| $d_{20} = 0.2$ | | |
| $r_{21} = 87.100$ | | |
| $d_{21} = 2.8$ | $n_{12} = 1.48749$ | $\nu_{12} = 70.15$ |
| $r_{22} = -189.365$ | | |
| $d_{22} = 0.304$ | | |
| $r_{23} = 90.349$ | | |
| $d_{23} = 5.0$ | $n_{13} = 1.47069$ | $\nu_{13} = 67.39$ |
| $r_{24} = -1331.652$ | | |
| $d_{24} = 0.4$ | | |
| $r_{25} = 34.467$ | | |
| $d_{25} = 9.0$ | $n_{14} = 1.47069$ | $\nu_{14} = 67.39$ |
| $r_{26} = -48.453$ | | |
| $d_{26} = 2.0$ | $n_{15} = 1.80610$ | $\nu_{15} = 40.92$ |
| $r_{27} = 117.339$ | | |
| $d_{27} = 18.0$ | | |
| $r_{28} = 88.057$ | | |
| $d_{28} = 2.0$ | $n_{16} = 1.80518$ | $\nu_{16} = 25.43$ |
| $r_{29} = 32.739$ | | |
| $d_{29} = 3.0$ | | |
| $r_{30} = 148.485$ | | |
| $d_{30} = 6.5$ | $n_{17} = 1.47069$ | $\nu_{17} = 67.39$ |
| $r_{31} = -45.295$ | | |
| $d_{31} = 0.3$ | | |
| $r_{32} = 31.821$ | | |
| $d_{32} = 6.5$ | $n_{18} = 1.47069$ | $\nu_{18} = 67.39$ |
| $r_{33} = -273.756$ | | |

$f = 16 \sim 192$, $f_F = 118.000$, $f_V = 20.000$
$f_c = -76.800$, $f_E = 50.864$, $f_M = 55.709$

| | $d_8$ | $d_{15}$ | $d_{18}$ |
|---|---|---|---|
| $f = 16$ | 2.94 | 65.27 | 2.14 |
| $f = 55.43$ | 45.66 | 11.75 | 12.95 |
| $f = 192$ | 66.45 | 1.76 | 2.14 |

Embodiment 6

| | | |
|---|---|---|
| $r_1 = 214.145$ | | |
| $d_1 = 12.0$ | $n_1 = 1.56873$ | $\nu_1 = 63.16$ |
| $r_2 = -331.621$ | | |
| $d_2 = 0.2$ | | |
| $r_3 = 163.002$ | | |
| $d_3 = 10.5$ | $n_2 = 1.56873$ | $\nu_2 = 63.16$ |
| $r_4 = -1259.870$ | | |
| $d_4 = 3.5$ | | |
| $r_5 = -277.248$ | | |
| $d_5 = 3.5$ | $n_3 = 1.76182$ | $\nu_3 = 26.55$ |
| $r_6 = 332.597$ | | |
| $d_6 = 0.2$ | | |
| $r_7 = 94.687$ | | |
| $d_7 = 13.0$ | $n_4 = 1.48749$ | $\nu_4 = 70.15$ |
| $r_8 = -1639.118$ | | |
| $d_8$ variable | | |
| $r_9 = -138.707$ | | |
| $d_9 = 3.5$ | $n_5 = 1.77250$ | $\nu_5 = 49.60$ |
| $r_{10} = -70.125$ | | |
| $d_{10} = 1.5$ | $n_6 = 1.62374$ | $\nu_6 = 47.10$ |
| $r_{11} = 38.021$ | | |
| $d_{11} = 3.0$ | | |
| $r_{12} = 251.015$ | | |
| $d_{12} = 1.0$ | $n_7 = 1.58913$ | $\nu_7 = 61.11$ |
| $r_{13} = 28.580$ | | |
| $d_{13} = 6.5$ | | |
| $r_{14} = -74.981$ | | |
| $d_{14} = 1.0$ | $n_8 = 1.51633$ | $\nu_8 = 64.15$ |
| $r_{15} = 23.871$ | | |
| $d_{15} = 4.0$ | $n_9 = 1.78472$ | $\nu_9 = 25.71$ |
| $r_{16} = 69.895$ | | |
| $d_{16}$ variable | | |
| $r_{17} = 37.620$ | | |
| $d_{17} = 1.1$ | $n_{10} = 1.51823$ | $\nu_{10} = 58.96$ |
| $r_{18} = 29.953$ | | |
| $d_{18} = 2.8$ | $n_{11} = 1.54072$ | $\nu_{11} = 47.20$ |
| $r_{19} = \infty$ | | |
| $d_{19}$ variable | | |
| $r_{20} = 287.733$ | | |
| $d_{20} = 3.2$ | $n_{12} = 1.48749$ | $\nu_{12} = 70.15$ |
| $r_{21} = -39.058$ | | |
| $d_{21} = 0.2$ | | |
| $r_{22} = 84.811$ | | |
| $d_{22} = 2.8$ | $n_{13} = 1.48749$ | $\nu_{13} = 70.15$ |
| $r_{23} = -199.315$ | | |
| $d_{23} = 2.069$ | | |
| $r_{24} = 87.487$ | | |
| $d_{24} = 5.0$ | $n_{14} = 1.47069$ | $\nu_{14} = 67.39$ |
| $r_{25} = -1092.277$ | | |
| $d_{25} = 0.4$ | | |

-continued

| | | |
|---|---|---|
| $r_{26} = 33.706$ | | |
| $d_{26} = 9.0$ | $n_{15} = 1.47069$ | $\nu_{15} = 67.39$ |
| $r_{27} = -49.508$ | | |
| $d_{27} = 2.0$ | $n_{16} = 1.80610$ | $\nu_{16} = 40.92$ |
| $r_{28} = 124.395$ | | |
| $d_{28} = 18.0$ | | |
| $r_{29} = 87.234$ | | |
| $d_{29} = 2.0$ | $n_{17} = 1.80518$ | $\nu_{17} = 25.43$ |
| $r_{30} = 33.280$ | | |
| $d_{30} = 3.0$ | | |
| $r_{31} = 150.972$ | | |
| $d_{31} = 6.5$ | $n_{18} = 1.47069$ | $\nu_{18} = 67.39$ |
| $r_{32} = -45.363$ | | |
| $d_{32} = 0.3$ | | |
| $r_{33} = 31.936$ | | |
| $d_{33} = 6.5$ | $n_{19} = 1.47069$ | $\nu_{19} = 67.39$ |
| $r_{34} = -619.487$ | | |

$f = 16 \sim 192$, $f_F = 118.000$, $f_V = -20.000$
$f_c = -76.800$, $f_E = 50.864$, $f_M = 55.709$

| | $d_8$ | $d_{16}$ | $d_{19}$ |
|---|---|---|---|
| $f = 16$ | 0.97 | 67.49 | 2.13 |
| $f = 55.43$ | 43.69 | 13.97 | 12.93 |
| $f = 192$ | 64.47 | 3.99 | 2.13 |

Embodiment 7

| | | |
|---|---|---|
| $r_1 = 228.568$ | | |
| $d_1 = 12$ | $n_1 = 1.62041$ | $\nu_1 = 60.27$ |
| $r_2 = -337.332$ | | |
| $d_2 = 0.2$ | | |
| $r_3 = 185.586$ | | |
| $d_3 = 10.5$ | $n_2 = 1.62041$ | $\nu_2 = 60.27$ |
| $r_4 = -2299.385$ | | |
| $d_4 = 3.5$ | | |
| $r_5 = -265.738$ | | |
| $d_5 = 3.5$ | $n_3 = 1.80518$ | $\nu_3 = 25.43$ |
| $r_6 = 272.548$ | | |
| $d_6 = 0.2$ | | |
| $r_7 = 95.394$ | | |
| $d_7 = 1.3$ | $n_4 = 1.62041$ | $\nu_4 = 60.27$ |
| $r_8 = \infty$ | | |
| $d_8$ variable | | |
| $r_9 = -155.890$ | | |
| $d_9 = 1$ | $n_5 = 1.80440$ | $\nu_5 = 39.62$ |
| $r_{10} = 38.198$ | | |
| $d_{10} = 6$ | | |
| $r_{11} = 229.737$ | | |
| $d_{11} = 1$ | $n_6 = 1.80440$ | $\nu_6 = 39.62$ |
| $r_{12} = 28.440$ | | |
| $d_{12} = 5.8$ | | |
| $r_{13} = -78.100$ | | |
| $d_{13} = 1$ | $n_7 = 1.51633$ | $\nu_7 = 64.15$ |
| $r_{14} = 24.282$ | | |
| $d_{14} = 4$ | $n_8 = 1.78472$ | $\nu_8 = 25.71$ |
| $r_{15} = 749.063$ | | |
| $d_{15}$ variable | | |
| $r_{16} = -37.564$ | | |
| $d_{16} = 1.1$ | $n_9 = 1.51823$ | $\nu_9 = 58.96$ |
| $r_{17} = 29.822$ | | |
| $d_{17} = 2.8$ | $n_{10} = 1.54072$ | $\nu_{10} = 47.20$ |
| $r_{18} = \infty$ | | |
| $d_{18}$ variable | | |
| $r_{19} = 264.493$ | | |
| $d_{19} = 3.2$ | $n_{11} = 1.48749$ | $\nu_{11} = 70.15$ |
| $r_{20} = -48.649$ | | |
| $d_{20} = 0.2$ | | |
| $r_{21} = 85.125$ | | |
| $d_{21} = 2.8$ | $n_{12} = 1.48749$ | $\nu_{12} = 70.15$ |
| $r_{22} = -218.244$ | | |
| $d_{22} = 0.432$ | | |
| $r_{23} = 92.597$ | | |
| $d_{23} = 3$ | $n_{13} = 1.47069$ | $\nu_{13} = 67.39$ |
| $r_{24} = -1883.862$ | | |
| $d_{24} = 0.4$ | | |
| $r_{25} = 34.572$ | | |
| $d_{25} = 7$ | $n_{14} = 1.47069$ | $\nu_{14} = 67.39$ |
| $r_{26} = -51.651$ | | |
| $d_{26} = 2$ | $n_{15} = 1.80610$ | $\nu_{15} = 40.92$ |
| $r_{27} = 120.011$ | | |
| $d_{27} = 17$ | | |
| $r_{28} = 88.087$ | | |
| $d_{28} = 2$ | $n_{16} = 1.80518$ | $\nu_{16} = 25.43$ |
| $r_{29} = 33.076$ | | |
| $d_{29} = 3$ | | |
| $r_{30} = 152.630$ | | |
| $d_{30} = 5$ | $n_{17} = 1.47069$ | $\nu_{17} = 67.39$ |
| $r_{31} = -45.103$ | | |
| $d_{31} = 0.3$ | | |
| $r_{32} = 32.127$ | | |
| $d_{32} = 5$ | $n_{18} = 1.47069$ | $\nu_{18} = 67.39$ |
| $r_{33} = -560.551$ | | |

-continued

| | | |
|---|---|---|
| f = 16 ~ 192, | $f_F$ = 118.000, | $f_V$ = −20.000 |
| $f_C$ = −76.800, | $f_E$ = 50.684, | $f_M$ = 55.709 |

| | $d_8$ | $d_{16}$ | $d_{19}$ |
|---|---|---|---|
| f = 16 | 4.9 | 63.64 | 2.16 |
| f = 55.43 | 47.62 | 10.12 | 12.97 |
| f = 192 | 68.41 | 0.13 | 2.16 |

Embodiment 8

$r_1$ = 198.376
  $d_1$ = 12   $n_1$ = 1.48749   $\nu_1$ = 70.15
$r_2$ = −287.314
  $d_2$ = 0.2
$r_3$ = 147.755
  $d_3$ = 10.5   $n_2$ = 1.48749   $\nu_2$ = 70.15
$r_4$ = −1063.576
  $d_4$ = 3.5
$r_5$ = −282.101
  $d_5$ = 3.5   $n_3$ = 1.78472   $\nu_3$ = 25.71
$r_6$ = 427.025
  $d_6$ = 0.2
$r_7$ = 91.680
  $d_7$ = 13   $n_4$ = 1.48749   $\nu_4$ = 70.15
$r_8$ = −3639.316
  $d_8$ variable
$r_9$ = −125.825
  $d_9$ = 3.5   $n_5$ = 1.77250   $\nu_5$ = 49.60
$r_{10}$ = −71.164
  $d_{10}$ = 1.5   $n_6$ = 1.63854   $\nu_6$ = 55.38
$r_{11}$ = 37.679
  $d_{11}$ = 3
$r_{12}$ = 258.079
  $d_{12}$ = 1   $n_7$ = 1.63854   $\nu_7$ = 55.38
$r_{13}$ = 28.396
  $d_{13}$ = 5.5
$r_{14}$ = −75.138
  $d_{14}$ = 1   $n_8$ = 1.51633   $\nu_8$ = 64.15
$r_{15}$ = 24.010
  $d_{15}$ = 4   $n_9$ = 1.78472   $\nu_9$ = 25.71
$r_{16}$ = 88.891
  $d_{16}$ variable
$r_{17}$ = −36.025
  $d_{17}$ = 1.1   $n_{10}$ = 1.51823   $\nu_{10}$ = 58.96
$r_{18}$ = 29.786
  $d_{18}$ = 2.8   $n_{11}$ = 1.54072   $\nu_{11}$ = 47.20
$r_{19}$ = −930.498
  $d_{19}$ variable
$r_{20}$ = 238.319
  $d_{20}$ = 3.2   $n_{12}$ = 1.48749   $\nu_{12}$ = 70.15
$r_{21}$ = −50.267
  $d_{21}$ = 0.2
$r_{22}$ = 79.743
  $d_{22}$ = 2.8   $n_{13}$ = 1.48749   $\nu_{13}$ = 70.15
$r_{23}$ = −247.922
  $d_{23}$ = 2.306
$r_{24}$ = 88.429
  $d_{24}$ = 3   $n_{14}$ = 1.47069   $\nu_{14}$ = 67.39
$r_{25}$ = −1561.103
  $d_{25}$ = 0.4
$r_{26}$ = 33.434
  $d_{26}$ = 3   $n_{15}$ = 1.47069   $\nu_{15}$ = 67.39
$r_{27}$ = −54.093
  $d_{27}$ = 2   $n_{16}$ = 1.80610   $\nu_{16}$ = 40.92
$r_{28}$ = 133.818
  $d_{28}$ = 24
$r_{29}$ = 85.928
  $d_{29}$ = 2   $n_{17}$ = 1.80518   $\nu_{17}$ = 25.43
$r_{30}$ = 32.968
  $d_{30}$ = 3
$r_{31}$ = 151.108
  $d_{31}$ = 6   $n_{18}$ = 1.47069   $\nu_{18}$ = 67.39
$r_{32}$ = −43.475
  $d_{32}$ = 0.3
$r_{33}$ = 33.261
  $d_{33}$ = 6   $n_{19}$ = 1.47069   $\nu_{19}$ = 67.39
$r_{34}$ = −2969.684

| | | |
|---|---|---|
| f = 16 ~ 192, | $f_F$ = 118.000, | $f_V$ = −20.000 |
| $f_C$ = −76.800, | $f_E$ = 50.864, | $f_M$ = 55.709 |

| | $d_8$ | $d_{15}$ | $d_{18}$ |
|---|---|---|---|
| f = 16 | 1.83 | 67.7 | 2.09 |
| f = 55.43 | 44.55 | 14.17 | 12.9 |
| f = 192 | 65.33 | 4.19 | 2.09 |

Embodiment 9

$r_1$ = 432.916
  $d_1$ = 3.5   $n_1$ = 1.78472   $\nu_1$ = 25.71
$r_2$ = 133.442
  $d_2$ = 3.5
$r_3$ = 163.874
  $d_3$ = 14   $n_2$ = 1.48749   $\nu_2$ = 70.15
$r_4$ = −211.889
  $d_4$ = 0.2
$r_5$ = 99.310
  $d_5$ = 14   $n_3$ = 1.48749   $\nu_3$ = 70.15
$r_6$ = −1707.740
  $d_6$ = 0.2
$r_7$ = 61.218
  $d_7$ = 8   $n_4$ = 1.48749   $\nu_4$ = 70.15
$r_8$ = 73.005
  $d_8$ variable
$r_9$ = −111.268
  $d_9$ = 1.5   $n_5$ = 1.63854   $\nu_5$ = 55.38
$r_{10}$ = 40.356
  $d_{10}$ = 5
$r_{11}$ = 502.478
  $d_{11}$ = 1   $n_6$ = 1.63854   $\nu_6$ = 55.38
$r_{12}$ = 30.754
  $d_{12}$ = 5
$r_{13}$ = −76.121
  $d_{13}$ = 0.8   $n_7$ = 1.54771   $\nu_7$ = 62.83
$r_{14}$ = 24.920
  $d_{14}$ = 3.5   $n_8$ = 1.78472   $\nu_8$ = 25.71
$r_{15}$ = 154.049
  $d_{15}$ variable
$r_{16}$ = −38.093
  $d_{16}$ = 1.2   $n_9$ = 1.51633   $\nu_9$ = 64.15
$r_{17}$ = 30.077
  $d_{17}$ = 2.8   $n_{10}$ = 1.53256   $\nu_{10}$ = 45.91
$r_{18}$ = ∞
  $d_{18}$ variable
$r_{19}$ = 247.380
  $d_{19}$ = 3.1   $n_{11}$ = 1.51633   $\nu_{11}$ = 64.15
$r_{20}$ = −58.530
  $d_{20}$ = 0.1
$r_{21}$ = 92.912
  $d_{21}$ = 2.6   $n_{12}$ = 1.51633   $\nu_{12}$ = 64.15
$r_{22}$ = −168.781
  $d_{22}$ = 1.132
$r_{23}$ = 30.727
  $d_{23}$ = 16   $n_{13}$ = 1.51633   $\nu_{13}$ = 64.15
$r_{24}$ = −26.889
  $d_{24}$ = 1.8   $n_{14}$ = 1.78800   $\nu_{14}$ = 47.49
$r_{25}$ = −93.127
  $d_{25}$ = 0.5
$r_{26}$ = 29.940
  $d_{26}$ = 5   $n_{15}$ = 1.51633   $\nu_{15}$ = 64.15
$r_{27}$ = 77.872
  $d_{27}$ = 1.8   $n_{16}$ = 1.80518   $\nu_{16}$ = 25.43
$r_{28}$ = 20.027
  $d_{28}$ = 18
$r_{29}$ = 65.428
  $d_{29}$ = 5   $n_{17}$ = 1.51633   $\nu_{17}$ = 64.15
$r_{30}$ = −87.248
  $d_{30}$ = 0.5
$r_{31}$ = 43.090
  $d_{31}$ = 3   $n_{18}$ = 1.51633   $\nu_{18}$ = 64.15
$r_{32}$ = 147.083

| | | |
|---|---|---|
| f = 16 ~ 192 | $f_F$ = 120.000 | $f_V$ = −21.000 |
| $f_c$ = −76.800 | $f_E$ = 51.665 | $f_M$ = 57.025 |

| | $d_8$ | $d_{15}$ | $d_{18}$ |
|---|---|---|---|
| f = 16 | 8.287 | 70.25 | 1.201 |
| f = 55.43 | 53.062 | 14.815 | 12.866 |
| f = 192 | 74.968 | 3.576 | 1.198 |

Embodiment 10

$r_1$ = 333.278
  $d_1$ = 3.5   $n_1$ = 1.75520   $\nu_1$ = 27.51
$r_2$ = 106.745
  $d_2$ = 4.3
$r_3$ = 126.369
  $d_3$ = 15   $n_2$ = 1.61800   $\nu_2$ = 63.38
$r_4$ = 2112.235
  $d_4$ = 0.2
$r_5$ = 123.752
  $d_5$ = 15   $n_3$ = 1.61800   $\nu_3$ = 63.38
$r_6$ = 416.781
  $d_6$ = 0.2
$r_7$ = 75.824
  $d_7$ = 9   $n_4$ = 1.61800   $\nu_4$ = 63.38
$r_8$ = 92.280
  $d_8$ variable
$r_9$ = −160.255
  $d_9$ = 4   $n_5$ = 1.69680   $\nu_5$ = 56.51
$r_{10}$ = −100.000
  $d_{10}$ = 1.5   $n_6$ = 1.58921   $\nu_6$ = 41.08
$r_{11}$ = 39.727
  $d_{11}$ = 3.5

-continued

| | | |
|---|---|---|
| $r_{12} = 394.901$ | | |
| $d_{12} = 1.5$ | $n_7 = 1.63854$ | $\nu_7 = 55.38$ |
| $r_{13} = 30.277$ | | |
| $d_{13} = 4$ | | |
| $r_{14} = -71.461$ | | |
| $d_{14} = 1$ | $n_8 = 41.51633$ | $\nu_8 = 64.15$ |
| $r_{15} = 25.230$ | | |
| $d_{15} = 3.5$ | $n_9 = 1.78472$ | $\nu_9 = 25.71$ |
| $r_{16} = 83.906$ | | |
| $d_{16}$ variable | | |
| $r_{17} = -46.646$ | | |
| $d_{17} = 1.2$ | $n_{10} = 1.51633$ | $\nu_{10} = 64.15$ |
| $r_{18} = 29.574$ | | |
| $d_{18} = 2.8$ | $n_{11} = 1.53256$ | $\nu_{11} = 45.91$ |
| $r_{19} = 218.510$ | | |
| $d_{19}$ variable | | |
| $r_{20} = 151.155$ | | |
| $d_{20} = 2.5$ | $n_{12} = 1.51633$ | $\nu_{12} = 64.15$ |
| $r_{21} = 61.058$ | | |
| $d_{21} = 0.1$ | | |
| $r_{22} = 77.522$ | | |
| $d_{22} = 2.5$ | $n_{13} = 1.51633$ | $\nu_{13} = 64.15$ |
| $r_{23} = -542.892$ | | |
| $d_{23} = 1.809$ | | |
| $r_{24} = 35.861$ | | |
| $d_{24} = 17$ | $n_{14} = 1.51633$ | $\nu_{14} = 64.15$ |
| $r_{25} = -27.784$ | | |
| $d_{25} = 1.8$ | $n_{15} = 1.78300$ | $\nu_{15} = 36.15$ |
| $r_{26} = -98.518$ | | |
| $d_{26} = 0.5$ | | |
| $r_{27} = 32.787$ | | |
| $d_{27} = 13$ | $n_{16} = 1.51633$ | $\nu_{16} 64.15$ |
| $r_{28} = 73.584$ | | |
| $d_{28} = 1.8$ | $n_{17} = 1.80518$ | $\nu_{17} = 25.43$ |
| $r_{29} = 19.690$ | | |
| $d_{29} = 18$ | | |
| $r_{30} = 61.395$ | | |
| $d_{30} = 5$ | $n_{18} = 1.51633$ | $\nu_{18} = 64.15$ |
| $r_{31} = -96.179$ | | |
| $d_{31} = 0.5$ | | |
| $r_{32} = 40.523$ | | |
| $d_{32} = 3$ | $n_{19} = 1.51633$ | $\nu_{19} = 64.15$ |
| $r_{33} = -576.814$ | | |
| $f = 16 \sim 192$, | $f_F = 120.000$, | $f_V = -21.000$ |
| $f_C = -76.800$, | $f_E = 51.665$, | $f_M = 57.025$ |

| $f$ | $d_8$ | $d_{16}$ | $d_{19}$ |
|---|---|---|---|
| $f = 16$ | 6.521 | 71.839 | 3.366 |
| $f = 55.43$ | 51.296 | 16.400 | 14.031 |
| $f = 192$ | 73.202 | 5.161 | 3.363 |

In the above embodiments, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, reference symbols $\nu_1, \nu_2, \ldots$ respectively represent Abbe's numbers of respective lenses, and reference symbols $f_F, f_V, f_O, f_B, f_M$ and $f$ respectively represent focal lengths of the focusing lens group, variator lens group, compensator lens group, erector lens group, master lens group and the lens system as a whole.

Out of the above embodiments, Embodiments 1 through 4 have lens configuration as shown in FIG. 1. In these embodiments, the focusing lens group consists of a positive lens, negative lens, positive lens and positive lens arranged in the order from the object side toward the image side. Therefore, $N_a$ shown in the condition (1) corresponds to $n_1$, $n_3$ and $n_4$ respectively. The variator lens group consists of two negative cemented doublets and a negative lens. Therefore, $N_b$ shown in the condition (2) corresponds to $n_6$ and $n_8$ respectively and $R_a$ shown in the condition (3) corresponds to $r_{16}$. The compensator lens group consists of a negative cemented doublet and the erector lens group consists of two positive lenses. In the master lens group, the first lens component consists of a positive lens and a positive cemented doublet having large thickness, the second lens component is a negative lens, the third lens component is a positive lens and the fourth lens component is a positive lens. Therefore, $D_a$ in the condition (4) corresponds to the thickness $d_{26}$ of the thick lens constituting the first lens component in the master lens group (i.e., the lens on the object side in the positive cemented doublet) and $D_b + D_c$ in the condition (5) corresponds to $d_{28} + d_{30}$.

Figure 2:
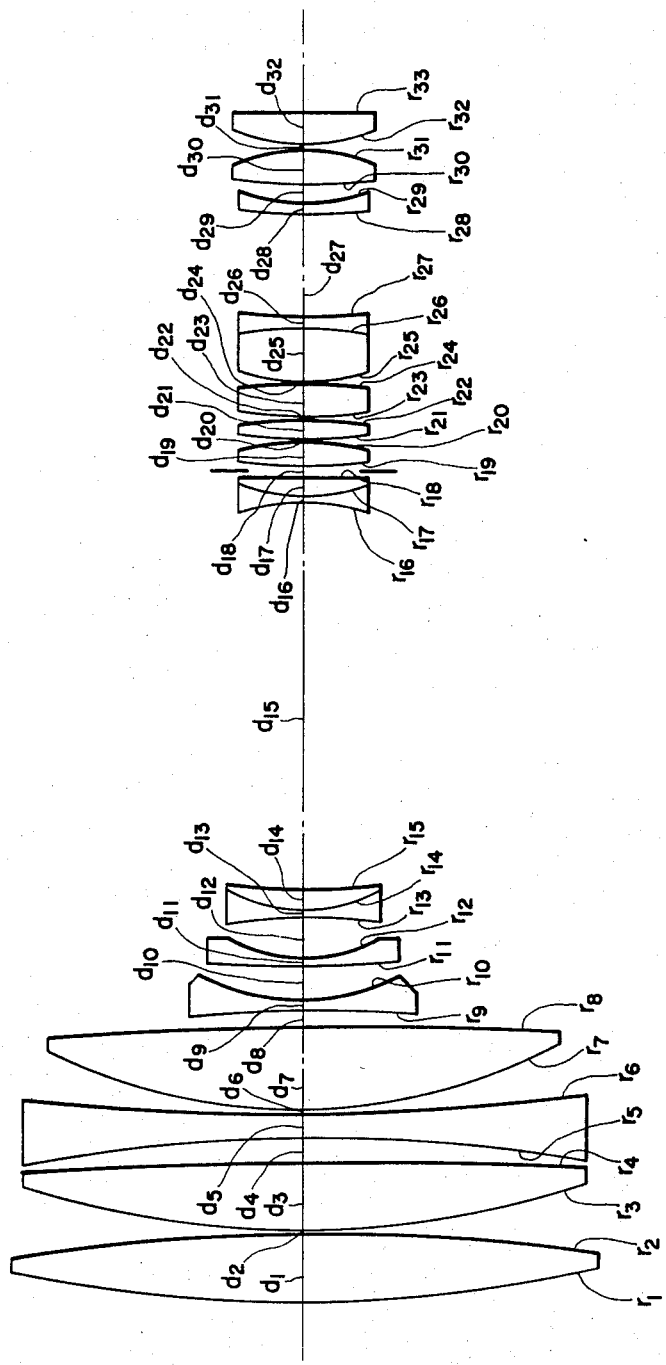

Embodiments 5 and 7 have lens configuration as shown in FIG. 2. In these embodiments, the focusing lens group consists of a positive lens, positive lens, negative lens and positive lens in the order from the object side toward the image side, and $N_a$ corresponds to $n_1$, $n_2$ and $n_4$. The variator lens group consists of two negative lenses and a negative cemented doublet. Therefore, $N_b$ corresponds to $n_5$ and $n_6$ and $R_a$ corresponds to $r_{15}$. The other lens groups have lens configurations which are substantially same as those shown in FIG. 1. Therefore, $D_a$ corresponds to $d_{25}$ and $D_b + D_c$ corresponds to $d_{27} + d_{29}$.

Figure 3:
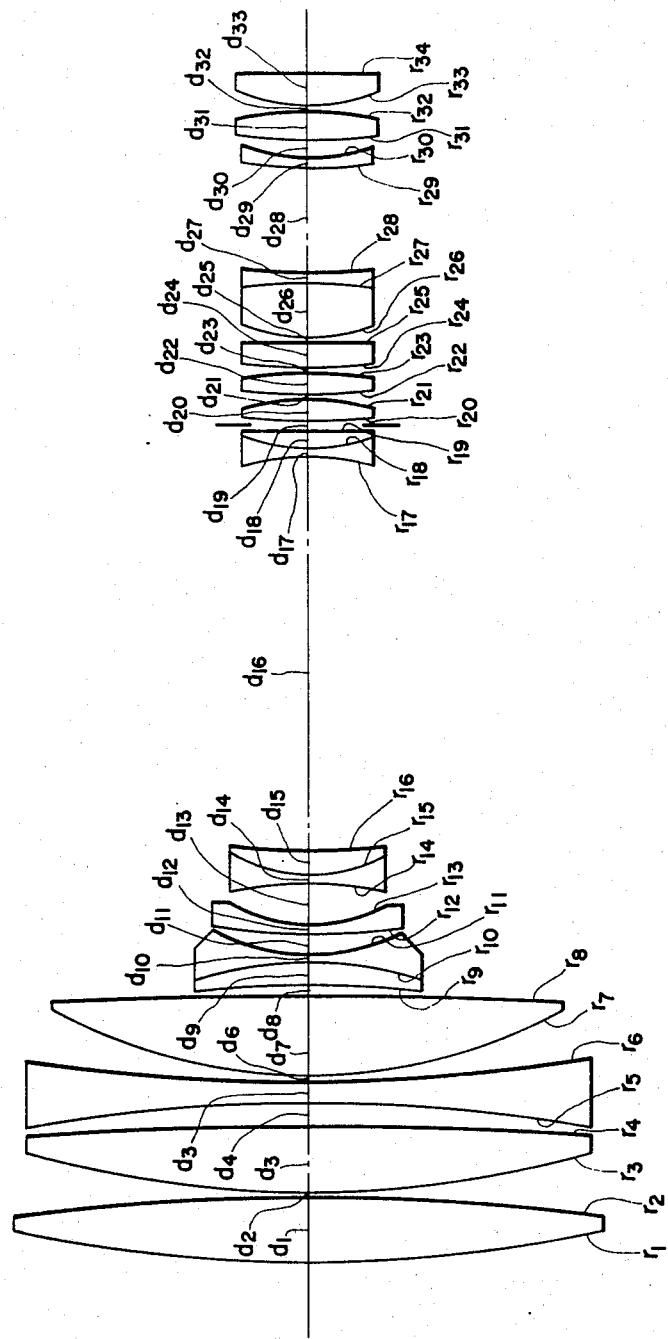

Embodiments 6 and 8 have lens configuration as shown in FIG. 3. In these embodiments, the variator lens group consists of a negative cemented doublet, negative lens and negative cemented doublet arranged in the order from the object side toward the image side. The other lens groups have lens configurations which are substantially same as those shown in FIG. 2. Therefore, $N_b$ corresponds to $n_6$ and $n_7$, $R_a$ corresponds to $r_{16}$, $D_a$ corresponds to $d_{26}$, and $D_b + D_c$ corresponds to $d_{28} + d_{30}$.

Figure 4:
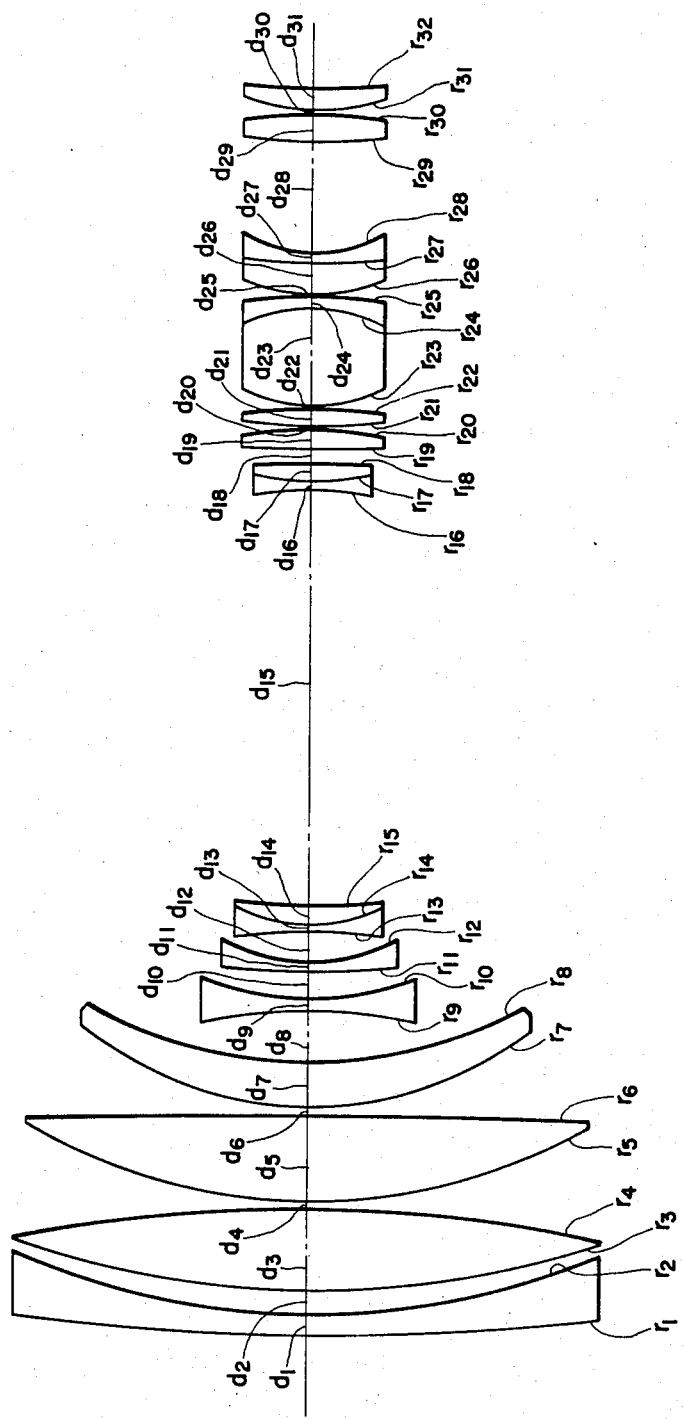

Embodiment 9 has lens configuration as shown in FIG. 4. In this embodiment, the negative lens in the focusing lens group is arranged at the position closest to the object side. That is, the focusing lens group consists of a negative lens, positive lens, positive lens and positive lens in the order from the object side toward the image side and, therefore, $N_a$ corresponds to $n_2$, $n_3$ and $n_4$. The variator lens group consists of a negative lens, negative lens and negative cemented doublet arranged in the order from the object side. Therefore, $N_b$ corresponds to $n_5$ and $n_6$ and $R_a$ corresponds to $r_{15}$. In the master lens groups, the first lens component is of a positive cemented doublet, the second lens component is a negative cemented doublet, the third lens component is a positive lens and the fourth lens component is a positive lens. Therefore, $D_a$ corresponds to the thickness $d_{23}$ of the thick lens on the object side in the first lens, and $D_b + D_c$ corresponds to $d_{25} + d_{28}$.

Figure 5:
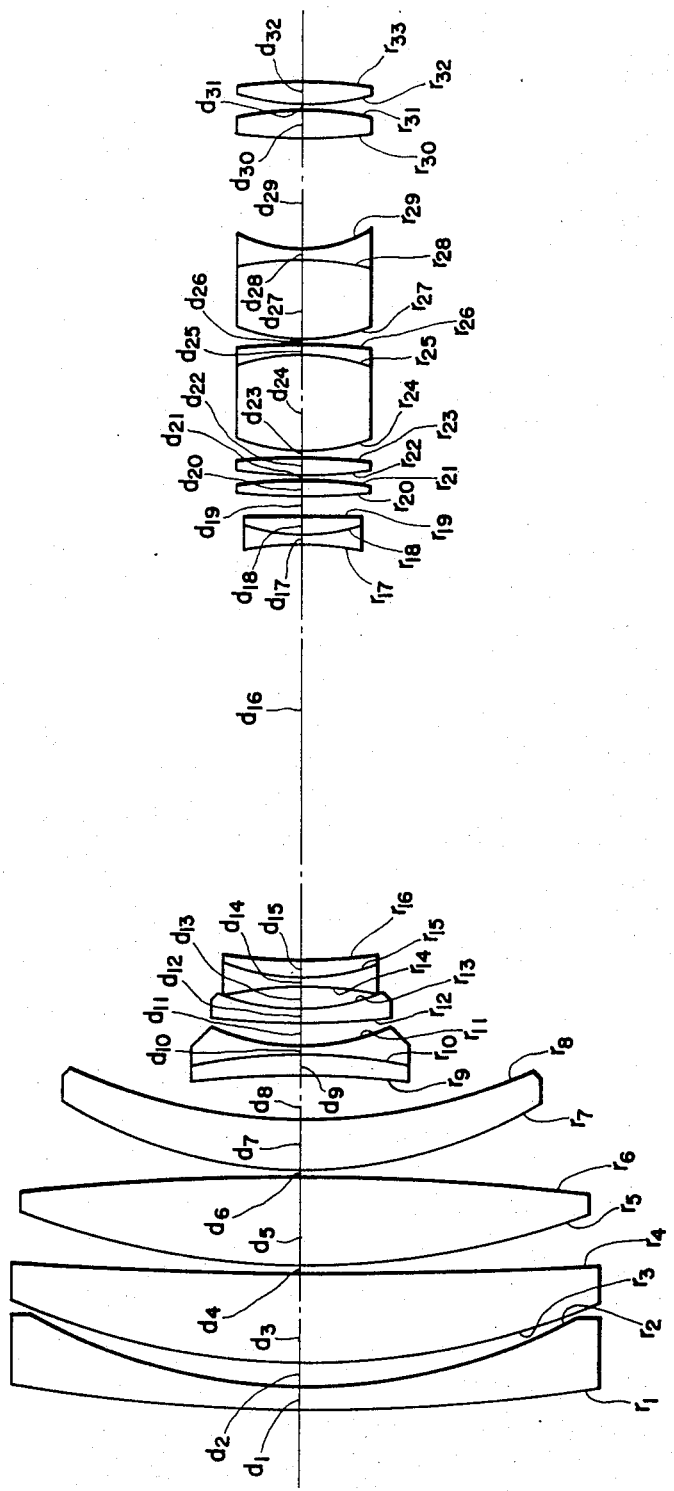

Embodiment 10 has lens configuration as shown in FIG. 5. In this embodiment, the variator lens group consists of a negative cemented doublet, negative lens and negative cemented doublet arranged in the order from the object side toward the image side. The other lens groups have lens configurations which are substantially same as those of Embodiment 9. Therefore, $N_a$ corresponds to $n_2$, $n_3$ and $n_4$, $N_b$ corresponds to $n_6$ and $n_7$, $R_a$ corresponds to $r_{16}$, $D_a$ corresponds to $d_{24}$, and $D_b + D_c$ corresponds to $d_{26} + d_{29}$.

In Embodiments 9 and 10 out of the above embodiments, the airspace $D_c$ ($d_{28}$ in Embodiment 9 and $d_{29}$ in Embodiment 10) is made large in addition to the fact that the value of $D_b + D_c$ is selected so that it satisfies the condition (5). By the above, it is possible to prevent undercorrection of Petzval's sum of the lens system as a whole which will otherwise be caused due to the fact that the zooming lens groups have strong negative powers. That is, though Petzval's sum is already corrected by means of the condition (1), it is preferable to select $D_c$ so that it becomes $0.3f < D_c$ in order to correct Petzval's sum more favourably by the master lens group.

Figure 18A:
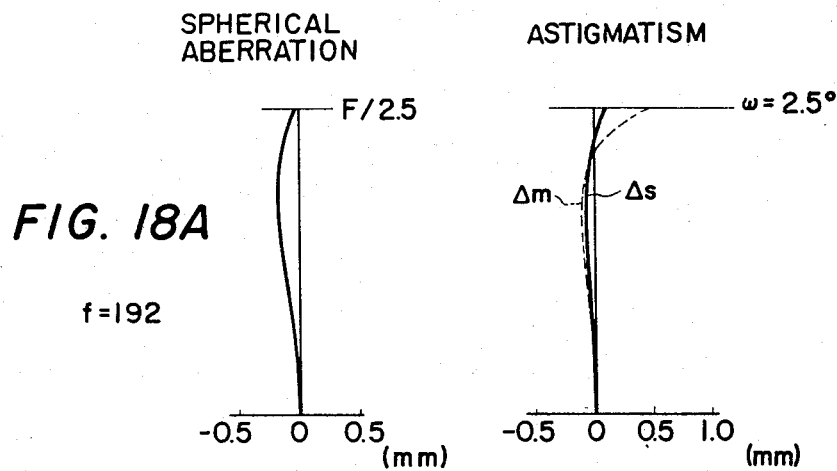
FIG. 18A shows graphs illustrating spherical aberration and astigmatism of Embodiment 10 before correction when the object distance is 2,000 mm.
Figure 18B:
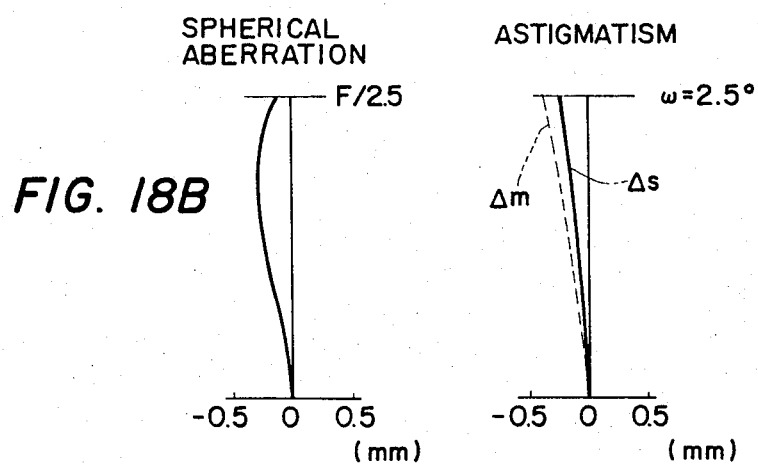
FIG. 18B shows graphs illustrating spherical aberration and astigmatism of Embodiment 10 after correction when the object distance is 2,000 mm.

Besides, as described already, the zoom lens system according to the present invention is arranged to prevent aggravation of aberrations, which is caused when photographing an object at a short distance, by varying an airspace in the focusing lens group. Two or three concrete examples of the above arrangement are described below. In the afore-mentioned Embodiment 1, it is possible to correct aberrations by moving the first two lenses toward the object side so that the airspace $d_4$ is widened, and this is attained when $d_4$ is increased by 1 when the object distance is 2,000 mm. It is evident from FIGS. 16A and 16B that aberrations are corrected favourably when the airspace $d_4$ is varied as described in the above. For Embodiment 1, values of $f_I$, $f_{IB}$, $f_{II}$ and $f_F$ are $f_I = 293.69$, $f_{IB} = 273.86$, $f_{II} = 89.9$ and $f_F = 121$. In the same way, in Embodiment 8, it is possible favourably correct aberrations in close-up photographing by varying $d_2$ so that it is widened, and this is attained when $d_2$ is increased by 1 when the object distance is 2,000 mm. Also, in this case, aberrations are corrected favourably as it is evident from FIGS. 17A and 17B. For Embodiment 8, values of $f_I$, $f_{IB}$, $f_{II}$ and $f_F$ are $f_I = 293.69$, $f_{IB} = 273.86$, $f_{II} = 89.9$ $f_F = 118$. In Embodiment 10, it is possible to favourably correct aberrations in close-up photographing by varying the airspace $d_4$ so that it is increased by 1 when the object distance is 2,000 mm. From FIGS. 18A and 18B, it is evident that aberrations are corrected favourably by varying the airspace $d_4$ as described in the above. For Embodiment 10, values of $f_I$, $f_{IB}$, $f_{II}$ and $f_F$ are $f_I = -209.341$, $f_{IB} = -208.4$, $f_{II} = 79.26$ and $f_F = 120$.

I claim:

1. A zoom lens system with high zooming ratio comprising a focusing lens group, variator lens group, compensator lens group, erector lens group and master lens group, said focusing lens group comprising three positive lens components and one negative lens component, said variator lens group comprising three negative lens components, said compensator lens group comprising a negative cemented doublet lens component, said erector lens group comprising two positive lens components, said master lens group comprising a first, second, third and fourth lens components, said first lens component having positive refractive power, said second lens component having negative refractive power, said third lens component being a positive lens, said fourth lens component being a positive lens, said zoom lens system with high zooming ratio satisfying the following conditions:

$$1.45 < N_a < 1.65 \quad (1)$$

$$1.57 < N_b < 1.82 \quad (2)$$

$$|3f_v| < |Ra| \quad (3)$$

$$0.05 f_M < D_a < 0.36 f_M \quad (4)$$

$$0.24 f_M < D_b + D_c < 0.6 f_M \quad (5)$$

wherein reference symbol $N_a$ represents refractive indices of positive lenses in the focusing lens group (but, refractive indices of those lenses may be different from each other), reference symbol $N_b$ represents refractive indices of two lenses on the object side in the variator lens group (but, refractive indices of the two lenses may be different from each other and, when one or both of those lenses are cemented doublets, $N_b$ represents refractive indices of negative lenses constituting those cemented doublets), reference symbol $R_a$ represents the radius of curvature of the lens surface closest to the image side in the variator lens group, reference symbol $D_a$ represents the thickness of the thick lens constituting the first lens component in the master lens group, reference symbol $D_b$ represents the airspace between the first and second lens components in the master lens group, reference symbol $D_c$ represents the airspace between the second and third lens components in the master lens group, reference symbol $f_V$ represents the focal length of the variator lens group, and reference symbol $f_M$ represents the focal length of the master lens group.

2. A zoom lens system with high zooming ratio according to claim 1 further satisfying the following condition:

$$57 < \nu_a < 71 \quad (6)$$

wherein reference symbol $\nu_a$ represents Abbe's numbers of positive lenses in the focusing lens group (but, Abbe's numbers of those lenses may be different from each other).

3. A zoom lens system with high zooming ratio according to claim 1 further satisfying the following condition:

$$38 < \nu_b < 62 \quad (7)$$

wherein reference symbol $\nu_b$ represents Abbe's numbers of the two negative lens components on the object side in the variator lens group (but, Abbe's numbers of the two lens components may be different from each other and, when one or both of those lens components are cemented doublets, $\nu_b$ represents Abbe's numbers of negative lenses constituting those cemented doublets).

4. A zoom lens system with high zooming ratio according to claim 1 further satisfying the following condition:

$$5 |f_v| < f_a < 20 |f_v| \quad (8)$$

wherein reference symbol $f_a$ represents the focal length of the lens component closest to the image side in the variatator lens group and reference symbol $f_v$ represents the focal length of the variator lens group.

5. A zoom lens system with high zooming ratio according to claim 1 further satisfying the following condition:

$$-0.65/f_F < 1/R_a < 0.05/f_F \quad (9)$$

wherein reference symbol $R_a$ represents radii of curvature of the surfaces on the image side of the positive lens positioned closest to the object side in the focusing lens group and/or of the positive lens positioned just on the image side of the negative lens in the focusing lens group, and reference symbol $f_F$ represents the focal length of the focusing lens group.

6. A zoom lens system with high zooming ratio according to claim 1 further satisfying the conditions given below wherein reference symbol $f_I$ represents the focal length of a movable lens group constituting said focusing lens group and comprising the lenses arranged on the object side of an airspace in said focusing lens group wherein paraxial rays become approximately parallel with the optical axis, reference symbol $f_{IB}$ represents the back focal length of said movable lens group, and reference symbol $f_F$ represents the focal length of said focusing lens group, said zoom lens system with high zooming ratio being arranged to correct aberrations by varying said airspace, when said zoom lens system is focused on an object at a distance different from the design object distance of said zoom lens system, at the same time as said focusing lens group is moved for the purpose of focusing:

$$1.5 f_F < |f_{IB}| \quad (10)$$

$$f_F < |f_I| < 3 f_F \quad (11)$$

7. A zoom lens system with high zooming ratio according to claim 1, in which said focusing lens group consists of a positive lens, negative lens, positive lens and positive lens in the order from the object side toward the image side.

8. A zoom lens system with high zooming ratio according to claim 7, in which said variator lens group consists of two negative cemented doublets, and one negative lens in the order from the object side toward the image side and in which said first lens component of said master lens group consists of a positive lens and positive cemented doublet, said second lens component is a negative lens, said third lens component is a positive lens, and said fourth lens component is a positive lens, said zoom lens system with high zooming ratio having the following numerical data;

| | | | |
|---|---|---|---|
| $r_1 = 158.296$ | | | |
| | $d_1 = 11.5$ | $n_1 = 1.623$ | $\nu_1 = 58.1$ |
| $r_2 = 2197.098$ | | | |
| | $d_2 = 0.2$ | | |
| $r_3 = 213.115$ | | | |
| | $d_3 = 3.0$ | $n_2 = 1.805$ | $\nu_2 = 25.4$ |
| $r_4 = 85.546$ | | | |
| | $d_4 = 3.5$ | | |
| $r_5 = 89.756$ | | | |
| | $d_5 = 17.0$ | $n_3 = 1.623$ | $\nu_3 = 58.1$ |
| $r_6 = 758.509$ | | | |
| | $d_6 = 1.2$ | | |
| $r_7 = 99.704$ | | | |
| | $d_7 = 9.0$ | $n_4 = 1.623$ | $\nu_4 = 58.1$ |
| $r_8 = 316.846$ | | | |
| | $d_8$ variable | | |
| $r_9 = 429.751$ | | | |
| | $d_9 = 6.0$ | $n_5 = 1.805$ | $\nu_5 = 25.4$ |
| $r_{10} = -78.647$ | | | |
| | $d_{10} = 1.8$ | $n_6 = 1.697$ | $\nu_6 = 55.5$ |
| $r_{11} = 37.297$ | | | |
| | $d_{11} = 4.8$ | | |
| $r_{12} = -223.383$ | | | |
| | $d_{12} = 3.8$ | $n_7 = 1.805$ | $\nu_7 = 25.4$ |
| $r_{13} = -62.115$ | | | |
| | $d_{13} = 1.2$ | $n_8 = 1.697$ | $\nu_8 = 55.5$ |
| $r_{14} = 65.013$ | | | |
| | $d_{14} = 4.6$ | | |
| $r_{15} = -36.284$ | | | |
| | $d_{15} = 1.6$ | $n_9 = 1.620$ | $\nu_9 = 60.3$ |
| $r_{16} = -469.412$ | | | |
| | $d_{16}$ variable | | |
| $r_{17} = -41.846$ | | | |
| | $d_{17} = 0.8$ | $n_{10} = 1.560$ | $\nu_{10} = 61.1$ |
| $r_{18} = 40.239$ | | | |
| | $d_{18} = 2.4$ | $n_{11} = 1.548$ | $\nu_{11} = 45.8$ |
| $r_{19} = -753.479$ | | | |
| | $d_{19}$ variable | | |
| $r_{20} = 196.376$ | | | |
| | $d_{20} = 2.8$ | $n_{12} = 1.516$ | $\nu_{12} = 64.2$ |
| $r_{21} = -64.862$ | | | |
| | $d_{21} = 0.2$ | | |
| $r_{22} = 77.367$ | | | |
| | $d_{22} = 2.5$ | $n_{13} = 1.516$ | $\nu_{13} = 64.2$ |
| $r_{23} = -171.623$ | | | |
| | $d_{23} = 0.6$ | | |
| $r_{24} = 1114.209$ | | | |
| | $d_{24} = 2.5$ | $n_{14} = 1.516$ | $\nu_{14} = 64.2$ |
| $r_{25} = -118.819$ | | | |
| | $d_{25} = 0.2$ | | |
| $r_{26} = 29.349$ | | | |
| | $d_{26} = 18.0$ | $n_{15} = 1.515$ | $\nu_{15} = 54.7$ |
| $r_{27} = -28.100$ | | | |
| | $d_{27} = 1.8$ | $n_{16} = 1.755$ | $\nu_{16} = 27.5$ |
| $r_{28} = 1438.933$ | | | |
| | $d_{28} = 10.8$ | | |
| $r_{29} = 72.293$ | | | |
| | $d_{29} = 1.8$ | $n_{17} = 1.755$ | $\nu_{17} = 27.5$ |
| $r_{30} = 18.709$ | | | |

-continued

| | | | |
|---|---|---|---|
| | $d_{30} = 9.5$ | | |
| $r_{31} = 63.955$ | | | |
| | $d_{31} = 3.0$ | $n_{18} = 1.541$ | $\nu_{18} = 47.2$ |
| $r_{32} = -200.489$ | | | |
| | $d_{32} = 0.2$ | | |
| $r_{33} = 32.745$ | | | |
| | $d_{33} = 4.0$ | $n_{19} = 1.541$ | $\nu_{19} = 47.2$ |
| $r_{34} = -59.973$ | | | |
| $f = 16 \sim 192$ | | $f_F = 121.0$ | $f_V = -20.5$ |
| $f_C = -77.44$ | | $f_E = 49.8$ | $f_M = 53.3$ |

| | $d_8$ | $d_{16}$ | $d_{19}$ |
|---|---|---|---|
| $f = 16$ | 1.63 | 71.05 | 1.37 |
| $f = 55.43$ | 45.3 | 16.32 | 12.43 |
| $f = 192$ | 66.72 | 5.96 | 1.37 | wherein reference symbols $r_1$ through $r_{34}$ respectively represent radii of curvature of respective lens surfaces, reference symbols $d_1$ through $d_{33}$ respectively represent thickness of respective lenses and airspaces between respective lenses, reference symbols $n_1$ through $n_{19}$ respectively represent refractive indices of respective lenses, reference symbols $\nu_1$ through $\nu_{19}$ respective represent Abbe's numbers of respective lenses, reference symbols $f_F$, $f_V$, $f_O$, $f_B$, $f_M$ and $f$ respectively represent focal lengths of the focusing lens group, variator lens group, compensator lens group, erector lens group, master lens group and the lens system as a whole.

9. A zoom lens system with high zooming ratio according to claim 7, in which said variator lens group consists of two negative cemented doublets, and one negative lens in the order from the object side toward the image side and in which said first lens component of said master lens group consists of a positive lens and positive cemented doublet, said second lens component is a negative lens, said third lens component is a positive lens, and said fourth lens component is a positive lens, said zoom lens system with high zooming ratio having the following numberical data:

| | | | |
|---|---|---|---|
| $r_1 = 133.100$ | | | |
| | $d_1 = 14.000$ | $n_1 = 1.56873$ | $\nu_1 = 63.16$ |
| $r_2 = 933.228$ | | | |
| | $d_2 = 0.200$ | | |
| $r_3 = 168.206$ | | | |
| | $d_3 = 3.0$ | $n_2 = 1.78472$ | $\nu_2 = 25.71$ |
| $r_4 = 88.024$ | | | |
| | $d_4 = 4.0$ | | |
| $r_5 = 102.995$ | | | |
| | $d_5 = 12.5$ | $n_3 = 1.48749$ | $\nu_3 = 70.15$ |
| $r_6 = 707.554$ | | | |
| | $d_6 = 0.2$ | | |
| $r_7 = 84.944$ | | | |
| | $d_7 = 12.5$ | $n_4 = 1.48749$ | $\nu_4 = 70.15$ |
| $r_8 = 31.464$ | | | |
| | $d_8$ variable | | |
| $r_9 = 193.259$ | | | |
| | $d_9 = 8.0$ | $n_5 = 1.80518$ | $\nu_5 = 25.43$ |
| $r_{10} = -79.919$ | | | |
| | $d_{10} = 1.8$ | $n_6 = 1.75700$ | $\nu_6 = 47.87$ |
| $r_{11} = 42.365$ | | | |
| | $d_{11} = 6.4$ | | |
| $r_{12} = -415.180$ | | | |
| | $d_{12} = 3.2$ | $n_7 = 1.80518$ | $\nu_7 = 25.43$ |
| $r_{13} = -60.449$ | | | |
| | $d_{13} = 1.4$ | $n_8 = 1.75700$ | $\nu_8 = 47.87$ |
| $r_{14} = 73.901$ | | | |
| | $d_{14} = 5.2$ | | |
| $r_{15} = -38.899$ | | | |
| | $d_{15} = 1.4$ | $n_9 = 1.62299$ | $\nu_9 = 58.14$ |
| $r_{16} = 194.328$ | | | |
| | $d_{16}$ variable | | |
| $r_{17} = -39.838$ | | | |
| | $d_{17} = 0.8$ | $n_{10} = 1.55963$ | $\nu_{10} = 61.14$ |
| $r_{18} = 34.340$ | | | |
| | $d_{18} = 2.4$ | $n_{11} = 1.54072$ | $\nu_{11} = 47.20$ |
| $r_{19} = -243.527$ | | | |
| | $d_{19}$ variable | | |
| $r_{20} = 274.360$ | | | |
| | $d_{20} = 2.5$ | $n_{12} = 1.51633$ | $\nu_{12} = 64.15$ |
| $r_{21} = -56.628$ | | | |
| | $d_{21} = 40.1$ | | |
| $r_{22} = 93.570$ | | | |
| | $d_{22} = 2.5$ | $n_{13} = 1.51633$ | $\nu_{13} = 64.15$ |

-continued

| | | |
|---|---|---|
| $r_{23} = -151.963$ | | |
| $d_{23} = 0.432$ | | |
| $r_{24} = 156.152$ | | |
| $d_{24} = 4.0$ | $n_{14} = 1.51633$ | $\nu_{14} = 64.15$ |
| $r_{25} = -1290.335$ | | |
| $d_{25} = 0.2$ | | |
| $r_{26} = 21.067$ | | |
| $d_{26} = 8.5$ | $n_{15} = 1.51633$ | $\nu_{15} = 64.15$ |
| $r_{27} = -31.823$ | | |
| $d_{27} = 1.8$ | $n_{16} = 1.74400$ | $\nu_{16} = 44.78$ |
| $r_{28} = 3069.674$ | | |
| $d_{28} = 8.0$ | | |
| $r_{29} = 58.260$ | | |
| $d_{29} = 1.8$ | $n_{17} = 1.76182$ | $\nu_{17} = 26.55$ |
| $r_{30} = 16.565$ | | |
| $d_{30} = 5.0$ | | |
| $r_{31} = 109.745$ | | |
| $d_{31} = 4.5$ | $n_{18} = 1.51633$ | $\nu_{18} = 64.15$ |
| $r_{32} = -61.884$ | | |
| $d_{32} = 0.2$ | | |
| $r_{33} = 24.680$ | | |
| $d_{33} = 4.5$ | $n_{19} = 1.51633$ | $\nu_{19} = 64.15$ |
| $r_{34} = 166.289$ | | |
| $f = 16 \sim 192$ | $f_F = 127.000$ | $f_V = -20.500$ |
| $f_C = -81.200$ | $f_E = 50.613$ | $f_M = 49.019$ |

| | $d_8$ | $d_{16}$ | $d_{19}$ |
|---|---|---|---|
| $f = 16$ | 0.8 | 67.52 | 1.74 |
| $f = 55.43$ | 44.1 | 11.35 | 14.63 |
| $f = 192$ | 65.9 | 2.43 | 1.74 | wherein reference symbols $r_1$ through $r_{34}$ respectively represent radii of curvature of respective lens surfaces, reference symbols $d_1$ through $d_{33}$ respectively represent thicknesses of respective lenses and airspaces between respective lenses, reference symbols $n_1$ though $n_{19}$ respectively represent refractive indices of respective lenses, reference symbols $\nu_1$ through $\nu_{19}$ respectively represent Abbe's numbers of respective lenses, reference symbols $f_F$, $f_V$, $f_C$, $f_E$, $f_M$ and $f$ respectively represent focal lengths of the focusing lens group, variator lens group, compensator lens group, erector lens group, master lens group and the lens system as a whole.

10. A zoom lens system with high zooming ratio according to claim 7, in which said variator lens group consists of two negative cemented doublets, and one negative lens in the order from the object side toward the image side and in which said first lens component of said master lens group consists of a positive lens and positive cemented doublet, said second lens component is a negative lens, said third lens component is a positive lens, and said fourth lens component is a positive lens, said zoom lens system with high zooming ratio having the following numerical data:

| | | |
|---|---|---|
| $r_1 = 114.335$ | | |
| $d_1 = 12.0$ | $n_1 = 1.60311$ | $\nu_1 = 60.70$ |
| $r_2 = 736.861$ | | |
| $d_2 = 0.2$ | | |
| $r_3 = 196.827$ | | |
| $d_3 = 3.0$ | $n_2 = 1.80518$ | $\nu_2 = 25.43$ |
| $r_4 = 83.472$ | | |
| $d_4 = 3.5$ | | |
| $r_5 = 106.493$ | | |
| $d_5 = 12.0$ | $n_3 = 1.60311$ | $\nu_3 = 60.70$ |
| $r_6 = 570.408$ | | |
| $d_6 = 0.2$ | | |
| $r_7 = 96.660$ | | |
| $d_7 = 10.2$ | $n_4 = 1.60311$ | $\nu_4 = 60.70$ |
| $r_8 = 430.980$ | | |
| $d_8$ variable | | |
| $r_9 = 204.944$ | | |
| $d_9 = 6.2$ | $n_5 = 1.80518$ | $\nu_5 = 25.43$ |
| $r_{10} = -71.740$ | | |
| $d_{10} = 1.5$ | $n_6 = 1.65160$ | $\nu_6 = 58.67$ |
| $r_{11} = 36.157$ | | |
| $d_{11} = 5.0$ | | |
| $r_{12} = -148.933$ | | |
| $d_{12} = 2.5$ | $n_7 = 1.80518$ | $\nu_7 = 25.43$ |
| $r_{13} = -60.792$ | | |
| $d_{13} = 1.2$ | $n_8 = 1.65160$ | $\nu_8 = 58.67$ |
| $r_{14} = 59.571$ | | |
| $d_{14} = 4.5$ | | |

-continued

| | | |
|---|---|---|
| $r_{15} = -33.540$ | | |
| $d_{15} = 1.2$ | $n_9 = 1.62041$ | $\nu_9 = 60.27$ |
| $r_{16} =$ | | |
| $d_{16}$ variable | | |
| $r_{17} = -38.929$ | | |
| $d_{17} = 0.8$ | $n_{10} = 1.55963$ | $\nu_{10} = 61.14$ |
| $r_{18} = 39.004$ | | |
| $d_{18} = 2.4$ | $n_{11} = 1.54814$ | $\nu_{11} = 45.78$ |
| $r_{19} = -302.206$ | | |
| $d_{19}$ variable | | |
| $r_{20} = 165.358$ | | |
| $d_{20} = 2.8$ | $n_{12} = 1.51633$ | $\nu_{12} = 64.15$ |
| $r_{21} = -65.321$ | | |
| $d_{21} = 0.2$ | | |
| $r_{22} = 75.611$ | | |
| $d_{22} = 2.5$ | $n_{13} = 1.51633$ | $\nu_{13} = 64.15$ |
| $r_{23} = -247.013$ | | |
| $d_{23} = 0.419$ | | |
| $r_{24} = 217.139$ | | |
| $d_{24} = 2.5$ | $n_{14} = 1.51633$ | $\nu_{14} = 64.15$ |
| $r_{25} = -386.134$ | | |
| $d_{25} = 0.2$ | | |
| $r_{26} = 26.829$ | | |
| $d_{26} = 13.0$ | $n_{15} = 1.51454$ | $\nu_{15} = 54.69$ |
| $r_{27} = -27.152$ | | |
| $d_{27} = 1.8$ | $n_{16} = 1.75520$ | $\nu_{16} = 27.51$ |
| $r_{28} = -124.632$ | | |
| $d_{28} = 10.8$ | | |
| $r_{29} = 93.905$ | | |
| $d_{29} = 1.8$ | $n_{17} = 1.75520$ | $\nu_{17} = 27.51$ |
| $r_{30} = 16.829$ | | |
| $d_{30} = 9.5$ | | |
| $r_{31} = 69.605$ | | |
| $d_{31} = 3.0$ | $n_{18} = 1.54814$ | $\nu_{18} = 45.78$ |
| $r_{32} = -346.516$ | | |
| $d_{32} = 0.2$ | | |
| $r_{33} = 28.706$ | | |
| $d_{33} = 5.0$ | $n_{19} = 1.54814$ | $\nu_{19} = 45.78$ |
| $r_{34} = -87.603$ | | |
| $f = 16 \sim 192$, | $f_F = 122.000$, | $f_V = -20.700$ |
| $f_C = 78.1000$, | $f_E = 50.586$, | $f_M = 53.553$ |

| | $d_8$ | $d_{16}$ | $d_{19}$ |
|---|---|---|---|
| $f = 16$ | 0.23 | 72.79 | 1.82 |
| $f = 55.43$ | 44.28 | 17.48 | 13.09 |
| $f = 19.2$ | 65.96 | 7.07 | 1.82 | wherein reference symbols $r_1$ through $r_{34}$ respectively represent radii of curvature of respective lens surfaces, reference symbols $d_1$ through $d_{33}$ respectively represent thicknesses of respective lenses and airspace between respective lenses, reference symbols $n_1$ through $n_{19}$ respectively represent refractive indices of respective lenses, reference symbols $\nu_1$ through $\nu_{19}$ respectively represent Abbe's numbers of respective lenses, reference symbols $f_F$, $f_V$, $f_C$, $f_E$, $f_M$ and $f$ respectively represent focal lengths of the focusing lens group, variator lens group, compensator lens group, erector lens group, master lens group and the lens system as a whole.

11. A zoom lens system with high zooming ratio according to claim 7, in which said variator lens group consists of two negative cemented doublets, and one negative lens in the order from the object side toward the image side and in which said first lens component of said master lens group consists of a positive lens and positive cemented doublet, said second lens component is a negative lens, said third lens component is a positive lens, and said fourth lens component is a positive lens, said zoom lens system with high zooming ration having the following numerical data:

| | | |
|---|---|---|
| $r_1 = 138.553$ | | |
| $d_1 = 13.0$ | $n_1 = 1.58913$ | $\nu_1 = 61.11$ |
| $r_2 = 857.977$ | | |
| $d_2 = 0.2$ | | |
| $r_3 = 184.829$ | | |
| $d_3 = 3.0$ | $n_2 = 1.80518$ | $\nu_2 = 25.43$ |
| $r_4 = 87.288$ | | |
| $d_4 = 3.5$ | | |
| $r_5 = 99.474$ | | |
| $d_5 = 13.5$ | $n_3 = 1.56873$ | $\nu_3 = 63.16$ |
| $r_6 = 621.5800$ | | |
| $d_6 = 0.2$ | | |

-continued $r_7 = 95.396$
$\quad d_7 = 10.5 \quad n_4 = 1.56873 \quad \nu_4 = 63.16$
$r_8 = 504.051$
$\quad d_8$ variable
$r_9 = 243.444$
$\quad d_9 = 6.0 \quad n_5 = 1.80518 \quad \nu_5 = 25.43$
$r_{10} = -80.163$
$\quad d_{10} = 1.8 \quad n_6 = 1.69350 \quad \nu_6 = 53.34$
$r_{11} = 37.603$
$\quad d_{11} = 4.2$
$r_{12} = -241.260$
$\quad d_{12} = 3.8 \quad n_7 = 1.80518 \quad \nu_7 = 25.43$
$r_{13} = -62.447$
$\quad d_{13} = 1.2 \quad n_8 = 1.69350 \quad \nu_8 = 53.34$
$r_{14} = 65.878$
$\quad d_{14} = 4.5$
$r_{15} = -37.701$
$\quad d_{15} = 1.2 \quad n_9 = 1.62041 \quad \nu_9 = 60.27$
$r_{16} = 309.752$
$\quad d_{16}$ variable
$r_{17} = -36.678$
$\quad d_{17} = 0.8 \quad n_{10} = 1.55963 \quad \nu_{10} = 61.14$
$r_{18} = 35.175$
$\quad d_{18} = 2.4 \quad n_{11} = 1.54814 \quad \nu_{11} = 45.78$
$r_{19} = -198.614$
$\quad d_{19}$ variable $\quad r_{20} = 194.216$
$\quad d_{20} = 2.8 \quad n_{12} = 1.51633 \quad \nu_{12} = 64.15$
$r_{21} = -62.779$
$\quad d_{21} = 0.2$
$r_{22} = 77.005$
$\quad d_{22} = 2.5 \quad n_{13} = 1.51633 \quad \nu_{13} = 64.15$
$r_{23} = -218.172$
$\quad d_{23} = 0.061$
$r_{24} = 171.270$
$\quad d_{24} = 2.5 \quad n_{14} = 1.51633 \quad \nu_{14} = 64.15$
$r_{25} = -346.014$
$\quad d_{25} = 0.2$
$r_{26} = 26.364$
$\quad d_{26} = 11.0 \quad n_{15} = 1.51454 \quad \nu_{15} = 54.69$
$r_{27} = -28.399$
$\quad d_{27} = 1.8 \quad n_{16} = 1.75520 \quad \nu_{16} = 27.51$
$r_{28} = -122.545$
$\quad d_{28} = 10.8$
$r_{29} = 97.359$
$\quad d_{29} = 1.8 \quad n_{17} = 1.75520 \quad \nu_{17} = 27.51$
$r_{30} = 16.704$
$\quad d_{30} = 9.5$
$r_{31} = 68.984$
$\quad d_{31} = 3.5 \quad n_{18} = 1.54814 \quad \nu_{18} = 45.78$
$r_{32} = -383.822$
$\quad d_{32} = 0.2$
$r_{33} = 27.419$
$\quad d_{33} = 4.5 \quad n_{19} = 1.54814 \quad \nu_{19} = 45.78$
$r_{34} = -119.733$
$f = 16 \sim 192 \quad f_F = 123.00 \quad f_V = -20.500$
$f_C = -78.500 \quad f_E = 50.551 \quad f_M = 52.662$

| | $d_8$ | $d_{16}$ | $d_{19}$ |
|---|---|---|---|
| f = 16 | 2.65 | 72.10 | 1.59 |
| f = 55.43 | 46.28 | 17.08 | 12.98 |
| f = 192 | 67.74 | 7.01 | 1.59 | wherein reference symbols $r_1$ through $r_{34}$ respectively represent radii of curvature of respective lens surfaces, reference symbols $d_1$ through $d_{33}$ respectively represent thicknesses of respective lenses and airspaces between respective lenses, reference symbols $n_1$ through $n19$ respectively represent refractive indices of respective lenses, reference symbols $\nu_1$ through $\nu_{19}$ respectively represent Abbe's numbers of respective lenses, reference symbols $f_F, f_V, f_O, f_E, f_M$ and $f$ respectively represent focal lengths of the focusing lens group, variator lens group, compensator lens group, erector lens group, master lens group and the lens system as a whole.

12. A zoom lens system with high zooming ratio according to claim 8 further arranged to correct abberations by varying said airspace $d_4$, when said zoom lens system is focused on an object at a distance different from the design object distance of said zoom lens system, at the same time as said focusing lens group is moved for the purpose of focusing.

13. A zoom lens system with high zooming ratio according to claim 1, in which said focusing lens group consists of a positive lens, positive lens, negative lens and positive lens in the order from the object side toward the image side.

14. A zoom lens system with zooming ratio according to claim 13, in which said variator lens group consists of two negative lenses and one negative cemented doublet in the order from the object side toward the image side and in which said first lens component of said master lens group consists of a positive lens and positive cemented doublet, said second lens component is a negative lens, said third lens component is a positive lens and said fourth lens component is a positive lens, said zoom lens system with high zooming ratio having the following numerical data:

$r_1 = 222.863$
$\quad d_1 = 12.0 \quad n_1 = 1.56873 \quad \nu_1 = 63.16$
$r_2 = -324.366$
$\quad d_2 = 0.2$
$r_3 = 163.746$
$\quad d_3 = 10.5 \quad n_2 = 1.56873 \quad \nu_2 = 63.16$
$r_4 = -1106.264$
$\quad d_4 = 3.5$
$r_5 = -247.772$
$\quad d_5 = 3.5 \quad n_3 = 1.76182 \quad \nu_3 = 26.55$
$r_6 = 341.708$
$\quad d_6 = 0.2$
$r_7 = 94.481$
$\quad d_7 = 13.0 \quad n_4 = 1.48749 \quad \nu_4 = 70.15$
$r_8 = -816.610$
$\quad d_8$ variable
$r_9 = 142.872$
$\quad d_9 = 1.0 \quad n_5 = 1.65844 \quad \nu_5 = 50.90$
$r_{10} = 38.188$
$\quad d_{10} = 6.0$
$r_{11} = 238.915$
$\quad d_{11} = 1.0 \quad n_6 = 1.65844 \quad \nu_6 = 50.90$
$r_{12} = 28.492$
$\quad d_{12} = 6.5$
$r_{13} = 77.070$
$\quad d_{13} = 1.0 \quad n_7 = 1.51633 \quad \nu_7 = 64.15$
$r_{14} = 24.079$
$\quad d_{14} = 4.0 \quad n_8 = 1.78472 \quad \nu_8 = 25.71$
$r_{15} = 106.026$
$\quad d_{15}$ variable
$r_{16} = -38.151$
$\quad d_{16} = 1.1 \quad n_9 = 1.51823 \quad \nu_9 = 58.96$
$r_{17} = 29.987$
$\quad d_{17} = 2.8 \quad n_{10} = 1.54072 \quad \nu_{10} = 47.20$
$r_{18} = 2871.455$
$\quad d_{18}$ variable
$r_{19} = 304.397$
$\quad d_{19} = 3.2 \quad n_{11} = 1.48749 \quad \nu_{11} = 70.15$
$r_{20} = -48.494$
$\quad d_{20} = 0.2$
$r_{21} = 87.100$
$\quad d_{21} = 2.8 \quad n_{12} = 1.48749 \quad \nu_{12} = 70.15$
$r_{22} = -189.365$
$\quad d_{22} = 0.304 \quad r_{23} = 90.349$
$\quad d_{23} = 5.0 \quad n_{13} = 1.47069 \quad \nu_{13} = 67.39$
$r_{24} = -1331.652$
$\quad d_{24} = 0.4$
$r_{25} = 34.467$
$\quad d_{25} = 9.0 \quad n_{14} = 1.47069 \quad \nu_{14} = 67.39$
$r_{26} = -48.453$
$\quad d_{26} = 2.0 \quad n_{15} = 1.80610 \quad \nu_{15} = 40.92$
$r_{27} = 117.339$
$\quad d_{27} = 18.0$
$r_{28} = 88.057$
$\quad d_{28} = 2.0 \quad n_{16} = 1.80518 \quad \nu_{16} = 25.43$
$r_{29} = 32.739$
$\quad d_{29} = 3.0$
$r_{30} = 148.485$
$\quad d_{30} = 6.5 \quad n_{17} = 1.47069 \quad \nu_{17} = 67.39$
$r_{31} = -45.295$
$\quad d_{31} = 0.3$
$r_{32} = 31.821$
$\quad d_{32} = 6.5 \quad n_{18} = 1.47069 \quad \nu_{18} = 67.39$
$r_{33} = -273.756$
$f = 16 \sim 192, \quad f_F = 118.000, \quad f_V = 20.000$
$f_c = -76.800, \quad f_E = 50.864, \quad f_M = 55.709$

| | $d_8$ | $d_{15}$ | $d_{18}$ |
|---|---|---|---|
| f = 16 | 2.94 | 65.27 | 2.14 |
| f = 55.43 | 45.66 | 11.75 | 12.95 |
| f = 192 | 66.45 | 1.76 | 2.14 | wherein reference symbols $r_1$ through $r_{33}$ respectively represent rodii of curvature of respective lens surfaces, reference symbols $d_1$ through $d_{32}$ respectively represent thicknesses of respectively lenses and airspaces between respective lenses, reference symbols $n_1$ through $n_{18}$ respectively represent refractive indices of respective lenses, reference symbols $\nu_1$ through $\nu_{18}$ respectively represent Abbe's numbers of respective lenses, reference symbols $f_F, f_V, f_O, f_E, f_M$ and $f$ respectively represent focal lengths of the focusing lens group, variator lens group, compensator lens group, erector lens group, master lens group and the lens system as a whole.

15. A zoom lens system with high zooming ratio according to claim 13, in which said variator lens group consists of two negative lenses and one negative cemented doublet in the order from the object side toward the image side and in which said first lens component of said master lens group consists of a positive lens and positive cemented doublet, said second lens component is a negative lens, said third lens component is a positive lens, and said fourth lens component is a positive lens, said zoom lens system with high zooming ratio having the following numerical data:

$r_1 = 228.568$
$d_1 = 12 \quad n_1 = 1.62041 \quad \nu_1 = 60.27$
$r_2 = -337.332$
$d_2 = 0.2$
$r_3 = 185.586$
$d_3 = 10.5 \quad n_2 = 1.62041 \quad \nu_2 = 60.27$
$r_4 = -2299.385$
$d_4 = 3.5$
$r_5 = -265.738$
$d_5 = 3.5 \quad n_3 = 1.80518 \quad \nu_3 = 25.43$
$r_6 = 272.548$
$d_6 = 0.2$
$r_7 = 95.394$
$d_7 = 1.3 \quad n_4 = 1.62041 \quad \nu_4 = 60.27$
$r_8 = \infty$
$d_8$ variable
$r_9 = -155.890$
$d_9 = 1 \quad n_5 = 1.80440 \quad \nu_5 = 39.62$
$r_{10} = 38.198$
$d_{10} = 6$
$r_{11} = 229.737$
$d_{11} = 1 \quad n_6 = 1.80440 \quad \nu_6 = 39.62$
$r_{12} = 28.440$
$d_{12} = 5.8$
$r_{13} = -78.100$
$d_{13} = 1 \quad n_7 = 1.51633 \quad \nu_7 = 64.15$
$r_{14} = 24.282$
$d_{14} = 4 \quad n_8 = 1.78472 \quad \nu_8 = 25.71$
$r_{15} = 749.063$
$d_{15}$ variable
$r_{16} = -37.564$
$d_{16} = 1.1 \quad n_9 = 1.51823 \quad \nu_9 = 58.96$
$r_{17} = 29.822$
$d_{17} = 2.8 \quad n_{10} = 1.54072 \quad \nu_{10} = 47.20$
$r_{18} = \infty$
$d_{18}$ variable
$r_{19} = 264.493$
$d_{19} = 3.2 \quad n_{11} = 1.48749 \quad \nu_{11} = 70.15$
$r_{20} = -48.649$
$d_{20} = 0.2$
$r_{21} = 85.125$
$d_{21} = 2.8 \quad n_{12} = 1.48749 \quad \nu_{12} = 70.15$
$r_{22} = -218.244$
$d_{22} = 0.432$
$r_{23} = 92.597$
$d_{23} = 3 \quad n_{13} = 1.47069 \quad \nu_{13} = 67.39$
$r_{24} = -1883.862$
$d_{24} = 0.4$
$r_{25} = 34.572$
$d_{25} = 7 \quad n_{14} = 1.47069 \quad \nu_{14} = 67.39$
$r_{26} = -51.651$
$d_{26} = 2 \quad n_{15} = 1.80610 \quad \nu_{15} = 40.92$
$r_{27} = 120.011$
$d_{27} = 17$
$r_{28} = 88.087$
$d_{28} = 2 \quad n_{16} = 1.80518 \quad \nu_{16} = 25.43$
$r_{29} = 33.076$
$d_{29} = 3$
$r_{30} = 152.630$
$d_{30} = 5 \quad n_{17} = 1.47069 \quad \nu_{17} = 67.39$
$r_{31} = -45.103$
$d_{31} = 0.3$
$r_{32} = 32.127$
$d_{32} = 5 \quad n_{18} = 1.47069 \quad \nu_{18} = 67.39$ $r_{33} = -560.551$
$f = 16 \sim 192, \quad f_F = 118.000, \quad f_V = -20.000$
$f_C = -76.800, \quad f_E = 50.684, \quad f_M = 55.709$

| | $d_8$ | $d_{16}$ | $d_{19}$ |
|---|---|---|---|
| $f = 16$ | 4.9 | 63.64 | 2.16 |
| $f = 55.43$ | 47.62 | 10.12 | 12.97 |
| $f = 192$ | 68.41 | 0.13 | 2.16 | wherein reference symbols $r_1$ through $r_{33}$ respectively represent radii of curvature of respective lens surfaces, reference symbols $d_1$ through $d_{32}$ respectively represent thicknesses of respective lenses and airspaces between respective lenses, reference symbols $n_1$ through $n_{18}$ respectively represent refractive indices of respective lenses, reference symbols $\nu_1$ through $\nu_{18}$ respectively represent Abbe's numbers of respective lenses, reference symbols $f_F, f_V, f_O, f_E, f_M$ and $f$ respectively represent focal lengths of the focusing lens group, variator lens group, compensator lens group, erector lens group, master lens group and the lens system as a whole.

16. A zoom lens system with high zooming ratio according to claim 13, in which said variator lens group consists of a negative cemented doublet, negative lens and negative cemented doublet in the order from the object side toward the image side and in which said first lens component of said master lens group consists of a positive lens and positive cemented doublet, said second lens component is a negative lens, said third lens component is a positive lens, and said fourth lens component is a positive lens, said zoom lens system with high zooming ratio having the following numerical data:

$r_1 = 214.145$
$d_1 = 12.0 \quad n_1 = 1.56873 \quad \nu_1 = 63.16$
$r_2 = -331.621$
$d_2 = 0.2$
$r_3 = 163.002$
$d_3 = 10.5 \quad n_2 = 1.56873 \quad \nu_2 = 63.16$
$r_4 = -1259.870$
$d_4 = 3.5$
$r_5 = 277.248$
$d_5 = 3.5 \quad n_3 = 1.76182 \quad \nu_3 = 26.55$
$r_6 = 332.597$
$d_6 = 0.2$
$r_7 = 94.687$
$d_7 = 13.0 \quad n_4 = 1.48749 \quad \nu_4 = 70.15$
$r_8 = -1639.118$
$d_8$ variable
$r_9 = -138.707$
$d_9 = 3.5 \quad n_5 = 1.77250 \quad \nu_5 = 49.60$
$r_{10} = -70.125$
$d_{10} = 1.5 \quad n_6 = 1.62374 \quad \nu_6 = 47.10$
$r_{11} = 38.021$
$d_{11} = 3.0$
$r_{12} = 251.015$
$d_{12} = 1.0 \quad n_7 = 1.58913 \quad \nu_7 = 61.11$
$r_{13} = 28.580$
$d_{13} = 6.5$
$r_{14} = -74.981$
$d_{14} = 1.0 \quad n_8 = 1.51633 \quad \nu_8 = 64.15$
$r_{15} = 23.871$
$d_{15} = 4.0 \quad n_9 = 1.78472 \quad \nu_9 = 25.71$
$r_{16} = 69.895$
$d_{16}$ variable
$r_{17} = -37.620$
$d_{17} = 1.1 \quad n_{10} = 1.51823 \quad \nu_{10} = 58.96$
$r_{18} = 29.953$
$d_{18} = 2.8 \quad n_{11} = 1.54072 \quad \nu_{11} = 47.20$
$r_{19} = \infty$
$d_{19}$ variable
$r_{20} = 287.733$
$d_{20} = 3.2 \quad n_{12} = 1.48749 \quad \nu_{12} = 70.15$
$r_{21} = -49.058$
$d_{21} = 0.2$
$r_{22} = 84.811$
$d_{22} = 2.8 \quad n_{13} = 1.48749 \quad \nu_{13} = 70.15$
$r_{23} = -199.315$
$d_{23} = 2.069$
$r_{24} = 87.487$
$d_{24} = 5.0 \quad n_{14} = 1.47069 \quad \nu_{14} = 67.39$
$r_{25} = -1092.277$
$d_{25} = 0.4$ -continued

| | | |
|---|---|---|
| $r_{26} = 33.706$ | | |
| $d_{26} = 9.0$ | $n_{15} = 1.47069$ | $v_{15} = 67.39$ |
| $r_{27} = -49.508$ | | |
| $d_{27} = 2.0$ | $n_{16} = 1.80610$ | $v_{16} = 40.92$ |
| $r_{28} = 124.395$ | | |
| $d_{28} = 18.0$ | | |
| $r_{29} = 87.234$ | | |
| $d_{29} = 2.0$ | $n_{17} = 1.80518$ | $v_{17} = 25.43$ |
| $r_{30} = 33.280$ | | |
| $d_{30} = 3.0$ | | |
| $r_{31} = 150.972$ | | |
| $d_{31} = 6.5$ | $n_{18} = 1.47069$ | $v_{18} = 67.39$ |
| $r_{32} = -45.363$ | | |
| $d_{32} = 0.3$ | | |
| $r_{33} = 31.936$ | | |
| $d_{33} = 6.5$ | $n_{19} = 1.47069$ | $v_{19} = 67.39$ |
| $r_{34} = -619.487$ | | |
| $f = 16 \sim 192$, | $f_F = 118.000$, | $f_V = -20.000$ |
| $f_c = -76.800$, | $f_E = 50.864$, | $f_M = 55.709$ |

| | $d_8$ | $d_{16}$ | $d_{19}$ |
|---|---|---|---|
| $f = 16$ | 0.97 | 67.49 | 2.13 |
| $f = 55.43$ | 43.69 | 13.97 | 12.93 |
| $f = 192$ | 64.47 | 3.99 | 2.13 | wherein reference symbols $r_1$ through $r_{34}$ respectively represent radii of curvature of respective lens surfaces, reference symbols $d_1$ through $d_{33}$ respectively represent thicknesses of respective lenses and airspaces between respective lenses, reference symbols $n_1$ through $n_{19}$ respectively represent refractive indices of respective lenses, reference symbols $v_1$ through $v_{19}$ respectively represent Abbe's numbers of respective lenses, reference symbols $f_F, f_V, f_O, f_E, f_M$ and $f$ respectively represent focal lengths of the focusing lens group, variator lens group, compensator lens group, erector lens group, master lens group and the lens system as a whole.

17. A zoom lens system with high zooming ratio according to claim 13, in which said variator lens group consists of a negative cemented doublet, negative lens and negative cemented doublet in the order from the object side toward the image side and in which said first lens component of said master lens group consists of a positive lens and positive cemented doublet, said second lens component is a negative lens, said third lens component is a positive lens, and said fourth lens component is a positive lens, said zoom lens system with high zooming ratio having the following numerical data:

| | | |
|---|---|---|
| $r_1 = 198.376$ | | |
| $d_1 = 12$ | $n_1 = 1.48749$ | $v_1 = 70.15$ |
| $r_2 = -287.314$ | | |
| $d_2 = 0.2$ | | |
| $r_3 = 147.755$ | | |
| $d_3 = 10.5$ | $n_2 = 1.48749$ | $v_2 = 70.15$ |
| $r_4 = 1063.576$ | | |
| $d_4 = 3.5$ | | |
| $r_5 = 282.101$ | | |
| $d_5 = 3.5$ | $n_3 = 1.78472$ | $v_3 = 25.71$ |
| $r_6 = 427.025$ | | |
| $d_6 = 0.2$ | | |
| $r_7 = 91.680$ | | |
| $d_7 = 13$ | $n_4 = 1.48749$ | $v_4 = 70.15$ |
| $r_8 = 3639.316$ | | |
| $d_8$ variable | | |
| $r_9 = -125.825$ | | |
| $d_9 = 3.5$ | $n_5 = 1.77250$ | $v_5 = 49.60$ |
| $r_{10} = -71.164$ | | |
| $d_{10} = 1.5$ | $n_6 = 1.63854$ | $v_6 = 55.38$ |
| $r_{11} = 37.679$ | | |
| $d_{11} = 3$ | | |
| $r_{12} = 258.079$ | | |
| $d_{12} = 1$ | $n_7 = 1.63854$ | $v_7 = 55.38$ |
| $r_{13} = 28.396$ | | |
| $d_{13} = 5.5$ | | |
| $r_{14} = 75.138$ | | |
| $d_{14} = 1$ | $n_8 = 1.51633$ | $v_8 = 64.15$ |
| $r_{15} = 24.010$ | | |
| $d_{15} = 4$ | $n_9 = 1.78472$ | $v_9 = 25.71$ |
| $r_{16} = 88.891$ | | |
| $d_{16}$ variable | | |
| $r_{17} = 36.025$ | | |
| $d_{17} = 1.1$ | $n_{10} = 1.51823$ | $v_{10} = 58.96$ |
| $r_{18} = 29.786$ | | |
| $d_{18} = 2.8$ | $n_{11} = 1.54072$ | $v_{11} = 47.20$ |
| $r_{19} = -930.498$ | | |
| $d_{19}$ variable | | |
| $r_{20} = 238.319$ | | |
| $d_{20} = 3.2$ | $n_{12} = 1.48749$ | $v_{12} = 70.15$ |
| $r_{21} = 50.267$ | | |
| $d_{21} = 0.2$ | | |
| $r_{22} = 79.743$ | | |
| $d_{22} = 2.8$ | $n_{13} = 1.48749$ | $v_{13} = 70.15$ |
| $r_{23} = 247.922$ | | |
| $d_{23} = 2.306$ | | |
| $r_{24} = 88.429$ | | |
| $d_{24} = 3$ | $n_{14} = 1.47069$ | $v_{14} = 67.39$ |
| $r_{25} = 1561.103$ | | |
| $d_{25} = 0.4$ | | |
| $r_{26} = 33.434$ | | |
| $d_{26} = 3$ | $n_{15} = 1.47069$ | $v_{15} = 67.39$ |
| $r_{27} = -54.093$ | | |
| $d_{27} = 2$ | $n_{16} = 1.80610$ | $v_{16} = 40.92$ |
| $r_{28} = 133.818$ | | |
| $d_{28} = 24$ | | |
| $r_{29} = 85.928$ | | |
| $d_{29} = 2$ | $n_{17} = 1.80518$ | $v_{17} = 25.43$ |
| $r_{30} = 32.968$ | | |
| $d_{30} = 3$ | | |
| $r_{31} = 151.108$ | | |
| $d_{31} = 6$ | $n_{18} = 1.47069$ | $v_{18} = 67.39$ |
| $r_{32} = 43.475$ | | |
| $d_{32} = 0.3$ | | |
| $r_{33} = 33.261$ | | |
| $d_{33} = 6$ | $n_{19} = 1.47069$ | $v_{19} = 67.39$ |
| $r_{34} = 2969.684$ | | |
| $f = 16 \sim 192$, | $f_F = 118.000$, | $f_V = -20.000$ |
| $f_c = -76.800$, | $f_E = 50.864$, | $f_M = 55.709$ |

| | $d_8$ | $d_{16}$ | $d_{19}$ |
|---|---|---|---|
| $f = 16$ | 1.83 | 67.7 | 2.09 |
| $f = 55.43$ | 44.55 | 14.17 | 12.9 |
| $f = 192$ | 65.33 | 4.19 | 2.09 | wherein reference symbols $r_1$ through $r_{34}$ respectively represent radii of curvature of respective lens surfaces, reference symbols $d_1$ through $d_{33}$ respectively represent thicknesses of respective lenses and airspaces between respective lenses, reference symbols $n_1$ through $n_{19}$ respectively represent refractive indices of respective lenses, reference symbols $v_1$ through $v_{19}$ respectively represent Abbe's numbers of respective lenses, reference symbols $f_F, f_V, f_O, f_E, f_M$ and $f$ respectively represent focal lengths of the focusing lens group, variator lens group, compensator lens group, erector lens group, master lens group and the lens system as a whole.

18. A zoom lens system with high zooming ratio according to claim 17 further arranged to correct aberrations by varying said airspace $d_2$, when said zoom lens system is focused on an object at a distance different from the design object distance of said zoom lens system, at the same time as said focusing lens group is moved for the purpose of focusing.

19. A zoom lens system with high zooming ratio according to claim 1, in which said focusing lens group consists of a negative lens, positive lens, positive lens and positive lens in the order from the object side toward the image side.

20. A zoom lens system with high zooming ratio according to claim 19, in which said variator lens group consists of two negative lenses and one negative cemented doublet in the order from the object side toward the image side and in which said first lens component of said master lens group is a positive cemented doublet, said second lens component is a negative cemented doublet, said third lens component is a positive lens, and said fourth lens component is a positive lens, said zoom lens system with high zooming ratio having the following numerical data:

| | | |
|---|---|---|
| $r_1 = 432.916$ | | |
| $d_1 = 3.5$ | $n_1 = 1.78472$ | $v_1 = 25.71$ |

-continued

| | | |
|---|---|---|
| $r_2 = 133.442$ | | |
| $d_2 = 3.5$ | | |
| $r_3 = 163.874$ | | |
| $d_3 = 14$ | $n_2 = 1.48749$ | $\nu_2 = 70.15$ |
| $r_4 = -211.889$ | | |
| $d_4 = 0.2$ | | |
| $r_5 = 99.310$ | | |
| $d_5 = 14$ | $n_3 = 1.48749$ | $\nu_3 = 70.15$ |
| $r_6 = 1707.740$ | | |
| $d_6 = 0.2$ | | |
| $r_7 = 61.218$ | | |
| $d_7 = 8$ | $n_4 = 1.48749$ | $\nu_4 = 70.15$ |
| $r_8 = 73.005$ | | |
| $d_8$ variable | | |
| $r_9 = 111.268$ | | |
| $d_9 = 1.5$ | $n_5 = 1.63854$ | $\nu_5 = 55.38$ |
| $r_{10} = 40.356$ | | |
| $d_{10} = 5$ | | |
| $r_{11} = 502.478$ | | |
| $d_{11} = 1$ | $n_6 = 1.63854$ | $\nu_6 = 55.38$ |
| $r_{12} = 30.754$ | | |
| $d_{12} = 5$ | | |
| $r_{13} = -76.121$ | | |
| $d_{13} = 0.8$ | $n_7 = 1.54771$ | $\nu_7 = 62.83$ |
| $r_{14} = 24.920$ | | |
| $d_{14} = 3.5$ | $n_8 = 1.78472$ | $\nu_8 = 25.71$ |
| $r_{15} = 154.049$ | | |
| $d_{15}$ variable | | |
| $r_{16} = 38.093$ | | |
| $d_{16} = 1.2$ | $n_9 = 1.51633$ | $\nu_9 = 64.15$ |
| $r_{17} = 30.077$ | | |
| $d_{17} = 2.8$ | $n_{10} = 1.53256$ | $\nu_{10} = 45.91$ |
| $r_{18} = \infty$ | | |
| $d_{18}$ variable | | |
| $r_{19} = 247.380$ | | |
| $d_{19} = 3.1$ | $n_{11} = 1.51633$ | $\nu_{11} = 64.15$ |
| $r_{20} = -58.530$ | | |
| $d_{20} = 0.1$ | | |
| $r_{21} = 92.912$ | | |
| $d_{21} = 2.6$ | $n_{12} = 1.51633$ | $\nu_{12} = 64.15$ |
| $r_{22} = -168.781$ | | |
| $d_{22} = 1.132$ | | |
| $r_{23} = 30.727$ | | |
| $d_{23} = 16$ | $n_{13} = 1.51633$ | $\nu_{13} = 64.15$ |
| $r_{24} = 26.889$ | | |
| $d_{24} = 1.8$ | $n_{14} = 1.78800$ | $\nu_{14} = 47.49$ |
| $r_{25} = -93.127$ | | |
| $d_{25} = 0.5$ | | |
| $r_{26} = 29.940$ | | |
| $d_{26} = 5$ | $n_{15} = 1.51633$ | $\nu_{15} = 64.15$ |
| $r_{27} = 77.872$ | | |
| $d_{27} = 1.8$ | $n_{16} = 1.80518$ | $\nu_{16} = 25.43$ |
| $r_{28} = 20.027$ | | |
| $d_{28} = 18$ | | |
| $r_{29} = 65.428$ | | |
| $d_{29} = 5$ | $n_{17} = 1.51633$ | $\nu_{17} = 64.15$ |
| $r_{30} = -87.248$ | | |
| $d_{30} = 0.5$ | | |
| $r_{31} = 43.090$ | | |
| $d_{31} = 3$ | $n_{28} = 1.51633$ | $\nu_{18} = 64.15$ |
| $r_{32} = 147.083$ | | |
| $f = 16 \sim 192$, | $f_F = 120.000$, | $f_V = -21.000$ |
| $f_c = 76.800$, | $f_E = 51.665$, | $f_M = 57.025$ |

| | $d_8$ | $d_{15}$ | $d_{18}$ |
|---|---|---|---|
| $f = 16$ | 8.287 | 70.25 | 1.201 |
| $f = 55.43$ | 53.062 | 14.815 | 12.866 |
| $f = 192$ | 74.968 | 3.576 | 1.198 | wherein reference symbols $r_1$ through $r_{32}$ respectively represent radii of curvature of respective lens surfaces, reference symbols $d_1$ through $d_{31}$ respectively represent thicknesses of respective lenses and airspaces between respective lenses, reference symbols $n_1$ through $n_{18}$ respectively represent refractive indices of respective lenses, reference symbols 1 through 18 respectively represent Abbe's numbers of respective lenses, reference symbols $f_F$, $f_V$, $f_O$, $f_E$, $f_M$ and $f$ respectively represent focal lengths of the focusing lens group, variator lens group, compensator lens group, erector lens group, master lens group and the lens system as a whole.

21. A zoom lens system with high zooming ratio according to claim 19, in which said variator lens group consists of a negative cemented doublet, negative lens and negative cemented doublet in the order from the object side toward the image side and in which said first lens component of said master lens group is a positive cemented doublet, said second lens component is a negative cemented doublet, said third lens component is a positive lens, and said fourth lens component is a positive lens, said zoom lens system with high zooming ratio having the following numerical data:

| | | |
|---|---|---|
| $r_1 = 333.278$ | | |
| $d_1 = 3.5$ | $n_1 = 1.75520$ | $\nu_1 = 27.51$ |
| $r_2 = 106.745$ | | |
| $d_2 = 4.3$ | | |
| $r_3 = 126.369$ | | |
| $d_3 = 15$ | $n_2 = 1.61800$ | $\nu_2 = 63.38$ |
| $r_4 = 2112.235$ | | |
| $d_4 = 0.2$ | | |
| $r_5 = 123.752$ | | |
| $d_5 = 15$ | $n_3 = 1.61800$ | $\nu_3 = 63.38$ |
| $r_6 = 416.781$ | | |
| $d_6 = 0.2$ | | |
| $r_7 = 75.824$ | | |
| $d_7 = 9$ | $n_4 = 1.61800$ | $\nu_4 = 63.38$ |
| $r_8 = 92.280$ | | |
| $d_8$ variable | | |
| $r_9 = 160.255$ | | |
| $d_9 = 4$ | $n_5 = 1.69680$ | $\nu_5 = 56.51$ |
| $r_{10} = 100.000$ | | |
| $d_{10} = 1.5$ | $n_6 = 1.58921$ | $\nu_6 = 41.08$ |
| $r_{11} = 39.727$ | | |
| $d_{11} = 3.5$ | | |
| $r_{12} = 394.901$ | | |
| $d_{12} = 1.5$ | $n_7 = 1.63854$ | $\nu_7 = 55.38$ |
| $r_{13} = 30.277$ | | |
| $d_{13} = 4$ | | |
| $r_{14} = 71.461$ | | |
| $d_{14} = 1$ | $n_8 = 1.51633$ | $\nu_8 = 64.15$ |
| $r_{15} = 25.230$ | | |
| $d_{15} = 3.5$ | $n_9 = 1.78472$ | $\nu_9 = 25.71$ |
| $r_{16} = 83.906$ | | |
| $d_{16}$ variable | | |
| $r_{17} = -46.646$ | | |
| $d_{17} = 1.2$ | $n_{10} = 1.51633$ | $\nu_{10} = 64.15$ |
| $r_{18} = 29.574$ | | |
| $d_{18} = 2.8$ | $n_{11} = 1.53256$ | $\nu_{11} = 45.91$ |
| $r_{19} = 218.510$ | | |
| $d_{19}$ variable | | |
| $r_{20} = 151.155$ | | |
| $d_{20} = 2.5$ | $n_{12} = 1.51633$ | $\nu_{12} = 64.15$ |
| $r_{21} = -61.058$ | | |
| $d_{21} = 0.1$ | | |
| $r_{22} = 77.522$ | | |
| $d_{22} = 2.5$ | $n_{13} = 1.51633$ | $\nu_{13} = 64.15$ |
| $r_{23} = 542.892$ | | |
| $d_{23} = 1.809$ | | |
| $r_{24} = 35.861$ | | |
| $d_{24} = 17$ | $n_{14} = 1.51633$ | $\nu_{14} = 64.15$ |
| $r_{25} = 27.784$ | | |
| $d_{25} = 1.8$ | $n_{15} = 1.78300$ | $\nu_{15} = 36.15$ |
| $r_{26} = 98.518$ | | |
| $d_{26} = 0.5$ | | |
| $r_{27} = 32.787$ | | |
| $d_{27} = 13$ | $n_{16} = 1.51633$ | $\nu_{16} = 64.15$ |
| $r_{28} = 73.584$ | | |
| $d_{28} = 1.8$ | $n_{17} = 1.80518$ | $\nu_{17} = 25.43$ |
| $r_{29} = 19.690$ | | |
| $d_{29} = 18$ | | |
| $r_{30} = 61.395$ | | |
| $d_{30} = 5$ | $n_{18} = 1.51633$ | $\nu_{18} = 64.15$ |
| $r_{31} = 96.179$ | | |
| $d_{31} = 0.5$ | | |
| $r_{32} = 40.523$ | | |
| $d_{32} = 3$ | $n_{19} = 1.51633$ | $\nu_{19} = 64.15$ |
| $r_{33} = -576.814$ | | |
| $f = 16 \sim 192$, | $f_F = 120.000$, | $f_V = 21.000$ |
| $f_C = 76.800$, | $f_E = 51.665$, | $f_M = 57.025$ |

| | $d_8$ | $d_{16}$ | $d_{19}$ |
|---|---|---|---|
| $f = 16$ | 6.521 | 71.839 | 3.366 |
| $f = 55.43$ | 51.296 | 16.400 | 14.031 |
| $f = 192$ | 73.202 | 5.161 | 3.363 | wherein reference symbols $r_1$ through $r_{33}$ respectively represent radii of curvature of respective lens surfaces, reference symbols $d_1$ through $d_{32}$ respectively represent thicknesses of respective lenses and airspaces between respective lenses, reference symbols $n_1$ through $n_{19}$ respectively represent refractive indices of respective lenses, reference symbols $\nu_1$ through $\nu_{19}$ respectively represent Abbe's numbers of respective lenses, reference symbols $f_F$, $f_V$, $f_O$, $f_E$, $f_M$ and $f$ respectively represent focal lengths of the focusing lens group, variator lens group, compensator lens group, erector lens group, master lens group and the lens system as a whole.

22. A zoom lens system with high zooming ratio according to claim 21 further arranged to correct aberrations by varying said airspace $d_4$, when said zoom lens system is focused on an object at a distance different from the design object distance of said zoom lens system, at the same time as said focusing lens group is moved for the purpose of focusing.

* * * * *